(12) United States Patent  
Chen et al.

(10) Patent No.: US 8,707,184 B2  
(45) Date of Patent: *Apr. 22, 2014

(54) CONTENT SHARING INTERFACE FOR SHARING CONTENT IN SOCIAL NETWORKS

(75) Inventors: Rita Chen, Forest Hills, NY (US); Shimrit Ben-Yair, Sunnyvale, CA (US); Jonathan Terleski, Mountain View, CA (US); Joseph Smarr, Half Moon Bay, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,636

(22) Filed: Jun. 20, 2011

(65) Prior Publication Data

US 2012/0110464 A1    May 3, 2012

Related U.S. Application Data

(60) Provisional application No. 61/408,732, filed on Nov. 1, 2010, provisional application No. 61/408,811, filed on Nov. 1, 2010.

(51) Int. Cl.
*G06F 3/00* (2006.01)

(52) U.S. Cl.
USPC ........... 715/738; 715/733; 715/734; 715/735; 715/736; 715/737; 715/739; 715/740; 715/741; 715/742; 715/743; 715/744; 715/745; 715/746; 715/747

(58) Field of Classification Search
USPC ................................. 715/733–747
See application file for complete search history.

(56) References Cited

U.S. PATENT DOCUMENTS

| 5,892,900 | A | 4/1999 | Ginter |
| 7,117,254 | B2 | 10/2006 | Lunt et al. |
| 7,167,910 | B2 | 1/2007 | Farnham et al. |
| 7,467,212 | B2 * | 12/2008 | Adams et al. ................. 709/229 |

(Continued)

FOREIGN PATENT DOCUMENTS

| WO | WO2012061318 A1 | 5/2012 |
| WO | WO2012061327 A3 | 8/2012 |

OTHER PUBLICATIONS

Authorized Officer Lee W. Young, International Search Report and Written Opinion for Application No. PCT/US11/58650, mailed Mar. 16, 2012, 14 pages.

(Continued)

*Primary Examiner* — Kieu Vu  
*Assistant Examiner* — Andrew Chung  
(74) *Attorney, Agent, or Firm* — Fish & Richardson P.C.

(57) ABSTRACT

Methods, systems, and apparatus, including computer programs encoded on a computer storage medium, for presenting, within a web page, a graphical representation of a content sharing interface including at least one button icon, receiving user input to the button icon, in response to the user input, expanding the content sharing interface to include an expanded content input area and a distribution interface, the expanded content input area displaying a graphical representation of digital content that is to be distributed, receiving user input to the distribution interface, the user input indicating contact(s) to which the digital content is to be distributed, in response to receiving the user input, displaying icon(s) within the distribution interface, the icon(s) being a graphical representation of the contact(s), and transmitting a post data set including digital content data and distribution data to a server computing system.

24 Claims, 13 Drawing Sheets

(56) References Cited

U.S. PATENT DOCUMENTS

| | | | |
|---|---|---|---|
| 7,478,078 B2 | 1/2009 | Lunt et al. | |
| 7,680,882 B2* | 3/2010 | Tiu et al. | 709/203 |
| 7,818,394 B1 | 10/2010 | Lawler et al. | |
| 7,886,024 B2 | 2/2011 | Kelly et al. | |
| 7,941,329 B2 | 5/2011 | Kenedy et al. | |
| 7,945,653 B2* | 5/2011 | Zuckerberg et al. | 709/223 |
| 7,970,657 B2* | 6/2011 | Morgenstern | 705/26.1 |
| 7,996,374 B1 | 8/2011 | Jones | |
| 8,000,726 B2 | 8/2011 | Altman et al. | |
| 8,010,458 B2 | 8/2011 | Galbreath et al. | |
| 8,028,905 B2 | 10/2011 | Holberg | |
| 8,031,170 B2* | 10/2011 | Brown et al. | 345/156 |
| 8,050,690 B2 | 11/2011 | Neeraj | |
| 8,099,424 B2 | 1/2012 | Kenedy et al. | |
| 8,108,377 B2 | 1/2012 | Jiang et al. | |
| 8,150,844 B2 | 4/2012 | Redstone et al. | |
| 8,166,120 B2 | 4/2012 | Kunz et al. | |
| 8,230,046 B2 | 7/2012 | Jiang | |
| 8,244,848 B1* | 8/2012 | Narayanan et al. | 709/223 |
| 8,352,859 B2 | 1/2013 | Zuckerberg et al. | |
| 8,423,392 B2 | 4/2013 | Moxley | |
| 2003/0217056 A1 | 11/2003 | Allen | |
| 2005/0198131 A1 | 9/2005 | Appelman et al. | |
| 2006/0004601 A1 | 1/2006 | Marks | |
| 2006/0021009 A1 | 1/2006 | Lunt | |
| 2006/0173963 A1 | 8/2006 | Roseway et al. | |
| 2006/0174340 A1 | 8/2006 | Santos | |
| 2006/0252547 A1 | 11/2006 | Mizrahi | |
| 2007/0200713 A1 | 8/2007 | Weber et al. | |
| 2007/0201086 A1 | 8/2007 | Kim et al. | |
| 2007/0219794 A1 | 9/2007 | Park | |
| 2007/0233736 A1 | 10/2007 | Xiong et al. | |
| 2007/0260587 A1 | 11/2007 | Mohan | |
| 2007/0288563 A1 | 12/2007 | Karkanias | |
| 2008/0066080 A1 | 3/2008 | Campbell | |
| 2008/0132252 A1 | 6/2008 | Altman et al. | |
| 2008/0160490 A1 | 7/2008 | Gomes | |
| 2008/0227063 A1 | 9/2008 | Kenedy et al. | |
| 2008/0228043 A1 | 9/2008 | Kenedy et al. | |
| 2008/0228531 A1 | 9/2008 | Kenedy et al. | |
| 2008/0228735 A1 | 9/2008 | Kenedy et al. | |
| 2008/0235242 A1 | 9/2008 | Swanburg et al. | |
| 2008/0235592 A1 | 9/2008 | Trauth | |
| 2008/0307511 A1 | 12/2008 | Ahtisaari | |
| 2009/0019374 A1 | 1/2009 | Logan et al. | |
| 2009/0024615 A1 | 1/2009 | Pedro | |
| 2009/0119173 A1 | 5/2009 | Parsons et al. | |
| 2009/0125521 A1 | 5/2009 | Petty | |
| 2009/0144392 A1* | 6/2009 | Wang et al. | 709/217 |
| 2009/0177385 A1* | 7/2009 | Matas et al. | 701/209 |
| 2009/0248516 A1 | 10/2009 | Gross | |
| 2009/0248635 A1 | 10/2009 | Gross | |
| 2009/0271409 A1 | 10/2009 | Ghosh | |
| 2009/0323555 A1 | 12/2009 | Lancaster et al. | |
| 2009/0327885 A1 | 12/2009 | Aoki et al. | |
| 2010/0049852 A1* | 2/2010 | Whitnah et al. | 709/226 |
| 2010/0057754 A1 | 3/2010 | Moudy et al. | |
| 2010/0077484 A1 | 3/2010 | Paretti et al. | |
| 2010/0145742 A1 | 6/2010 | Carey et al. | |
| 2010/0146054 A1 | 6/2010 | Armstrong et al. | |
| 2010/0151842 A1 | 6/2010 | De Vries | |
| 2010/0180211 A1 | 7/2010 | Boyd | |
| 2010/0183282 A1 | 7/2010 | Gopakumar | |
| 2010/0198648 A1 | 8/2010 | Bank et al. | |
| 2010/0203909 A1 | 8/2010 | Oldach | |
| 2010/0223250 A1 | 9/2010 | Guha | |
| 2010/0227594 A1 | 9/2010 | De Vries | |
| 2010/0241962 A1* | 9/2010 | Peterson et al. | 715/720 |
| 2010/0250685 A1 | 9/2010 | Kunz et al. | |
| 2010/0251177 A1 | 9/2010 | Geppert et al. | |
| 2010/0269068 A1 | 10/2010 | Labrador | |
| 2010/0287281 A1 | 11/2010 | Tirpak | |
| 2010/0306773 A1 | 12/2010 | Lee et al. | |
| 2010/0318571 A1 | 12/2010 | Pearlman et al. | |
| 2011/0004922 A1 | 1/2011 | Bono et al. | |
| 2011/0035264 A1 | 2/2011 | Zaloom | |
| 2011/0046980 A1 | 2/2011 | Metzler et al. | |
| 2011/0047169 A1 | 2/2011 | Leighton | |
| 2011/0083101 A1* | 4/2011 | Sharon et al. | 715/800 |
| 2011/0154223 A1 | 6/2011 | Whitnah et al. | |
| 2011/0184780 A1* | 7/2011 | Alderson et al. | 705/7.32 |
| 2011/0191246 A1 | 8/2011 | Brandstetter et al. | |
| 2011/0202864 A1 | 8/2011 | Hirsch et al. | |
| 2011/0202968 A1 | 8/2011 | Nurmi | |
| 2011/0258192 A1 | 10/2011 | Yao | |
| 2011/0270709 A1 | 11/2011 | Lewis et al. | |
| 2011/0275047 A1 | 11/2011 | Gomes | |
| 2012/0036216 A1 | 2/2012 | Aaltonen | |
| 2012/0060106 A1 | 3/2012 | Moxley | |
| 2012/0096352 A1 | 4/2012 | Maor et al. | |
| 2012/0109836 A1 | 5/2012 | Chen et al. | |
| 2012/0110064 A1 | 5/2012 | Chen et al. | |
| 2012/0110088 A1 | 5/2012 | Su et al. | |
| 2012/0110474 A1 | 5/2012 | Chen et al. | |
| 2012/0150901 A1 | 6/2012 | Johnson et al. | |

OTHER PUBLICATIONS

Authorized Officer Lee. W. Young, International Search Report and Written Opinion for Application No. PCT/US2011/058668, mailed May 18, 2012, 15 pages.

International Preliminary Report on Patentability in International Application No. PCT/US2011/058650, mailed May 16, 2013, 9 pages.

Authorized Officer Simin Baharlou, International Preliminary Report on Patentability for Application No. PCT/US2011/058668, mailed May 16, 2013, 11 pages.

Danah M. Boyd et al., "Social Network Sites: Definition, History and Scholarship," Journal of Computer-Mediated Communication, vol. 13, Issue 1, Oct. 2007, pp. 210-230.

Nathan Eagle et al., "Social Serendipity: Proximity Sensing and Cueing," MIT Media Laboratory Technical Note 580, May 2004, 18 pages.

Ralph Gross et al., "Information Revelation and Privacy in Online Social Networks," Proceeding of the 2005 ACM Workshop on Privacy in the Electronic Society (WPES'05), Nov. 7, 2005, pp. 71-80.

Junichiro Mori et al., "Real-world Oriented Information Sharing Using Social Networks," Proceedings of the 2005 International ACM SIGGROUP Conference on Supporting Group Work (Group 05), Nov. 6-9, 2005, pp. 81-84.

Andrew Leonard, "You are who you know," Salon Media Group, Inc., Jun. 15, 2004, 15 pages.

Jeffrey Heer et al., "Vizster: Visualizing Online Social Networks," IEEE Symposium on Information Visualization (INFOVIS 2005), Oct. 23-25, 2005, pp. 32-39.

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Alice Emily Marwick, "Selling Your Self: Online Identity in the Age of a Commodified Internet," Thesis for degree of Master of Arts, University of Washington, 2005, 192 pages.

Tony Hammond et al., "Social Bookmarking Tools (I)," D-Lib Magazine, vol. 11, No. 4, Apr. 2005, 23 pages.

Stefan Decker et al., "The Social Semantic Desktop," DERI Technical Report May 2, 2004, DERI—Digital Enterprise Research Institute, May 2004, 7 pages.

* cited by examiner

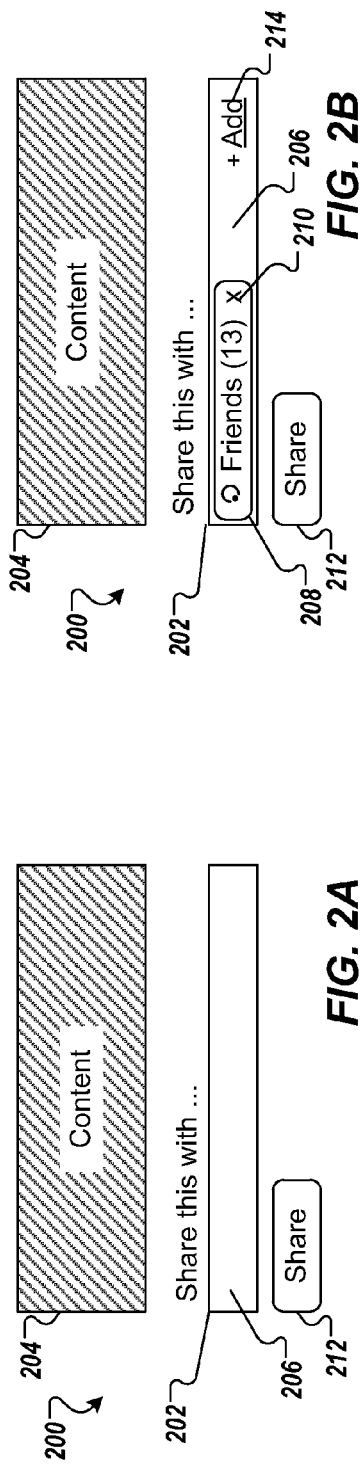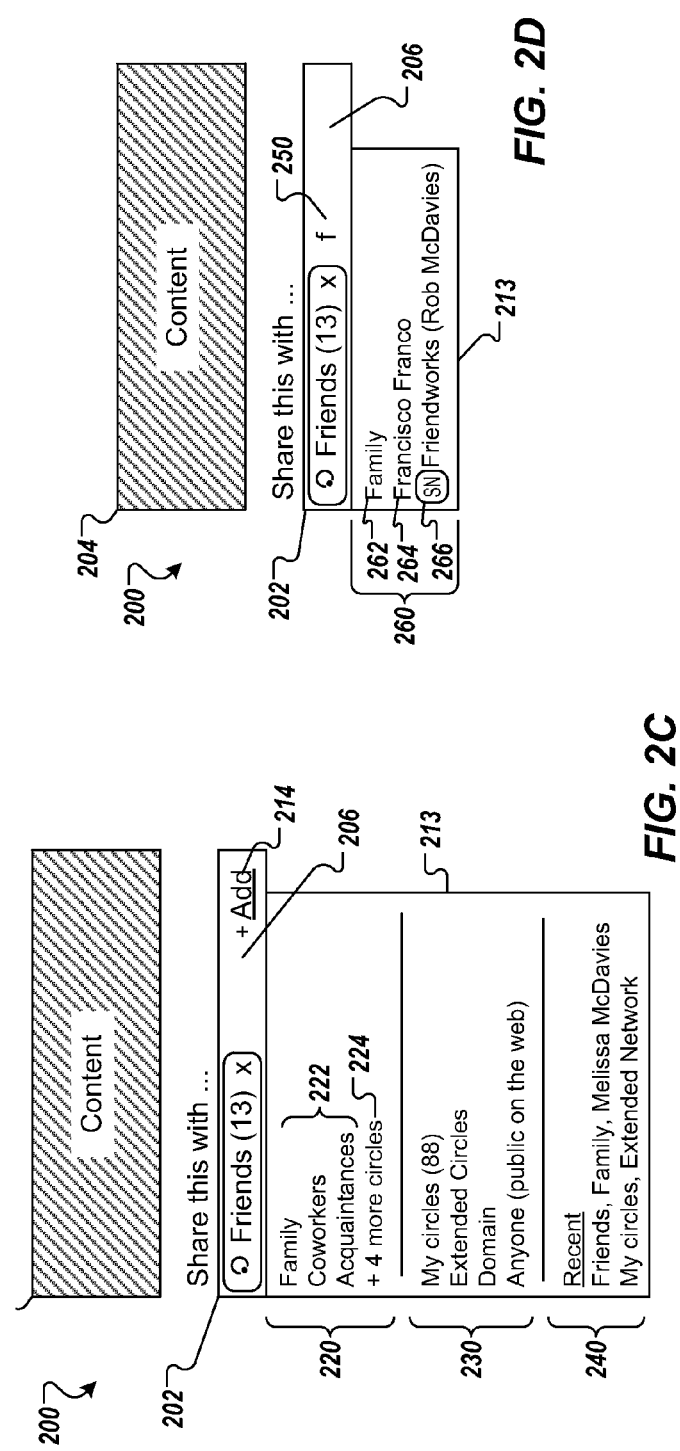

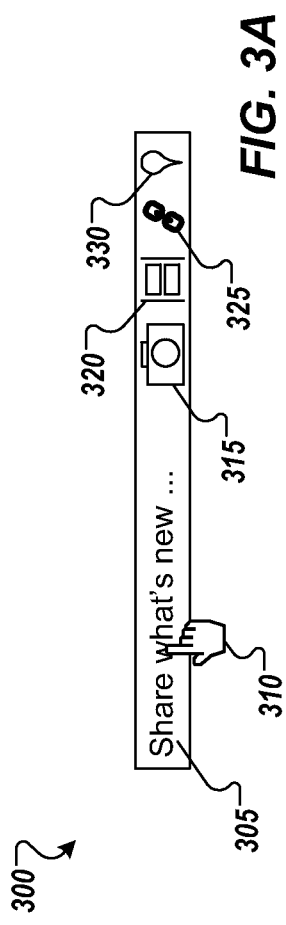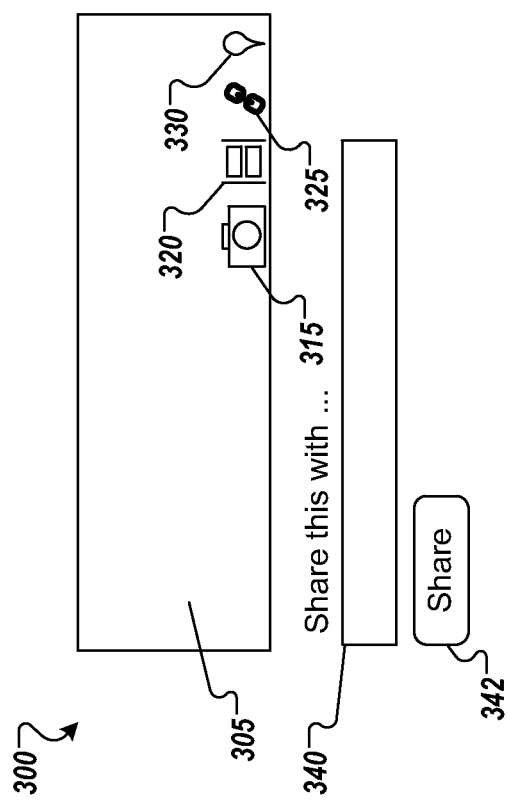
FIG. 3A
FIG. 3B

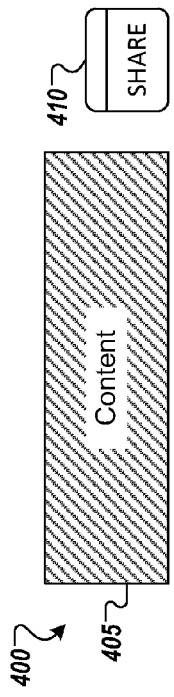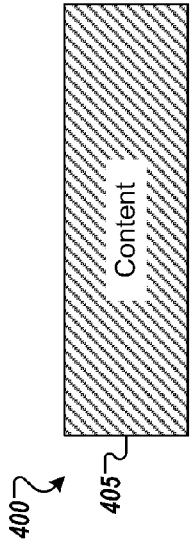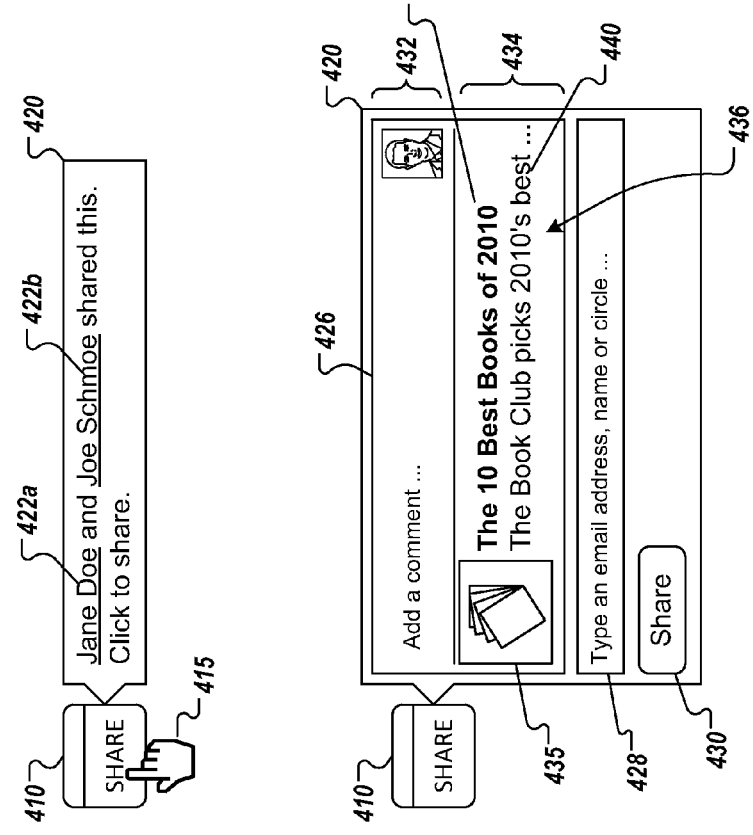
FIG. 4A
FIG. 4B
FIG. 4C

1008 — Includes contacts outside of your domain!
1002 — Anyone (public on the web) x
1004 — Soccer Club (11) x
1006 — Friends (13) x
1000
1010 — Post

FIG. 10B

1020
Posting outside of your domain!
The following include contacts outside of your domain:
1002 — Anyone (public on the web) x
1004 — Soccer Club (11) x
1022 — ☐ I want to post outside of my domain.
1024 — Post
1026 — Cancel

FIG. 11

1104 — johndoe@notdomain.com
This email address is not allowed by the domain administrator.
1100
1102 — Friends (13) x

CONTENT SHARING INTERFACE FOR SHARING CONTENT IN SOCIAL NETWORKS

CROSS-REFERENCE TO RELATED APPLICATIONS

This application claims the benefit of U.S. Prov. Pat. App. No. 61/408,732, filed Nov. 1, 2010, and U.S. Prov. Pat. App. No. 61/408,811, filed Nov. 1, 2010, the disclosures of which are expressly incorporated herein by reference in their entireties.

TECHNICAL FIELD

This specification generally relates to systems and methods for sharing digital content using a computer-implemented social networking service.

BACKGROUND

Computers and mobile devices, such as cellular phones and personal digital assistants, have become increasingly interconnected due to the widespread availability of wired and wireless connections to communications networks such as the Internet. Even in the earliest days of the ARPANET, users took advantage of such interconnectivity to communicate with one another through early forms of email. As email grew in availability and popularity, email "lists" became a popular tool for broadcasting messages to predefined groups of recipients.

In the 1980's, Internet based "newsgroups" emerged in which users could read and respond to discussion threads revolving around a wide variety of predefined categories. Newsgroups are generally readable and updatable by anyone with the equipment to access them, since access to newsgroups is generally not restricted on a per-newsgroup or per-user basis. World Wide Web based discussion groups (i.e., also known as clubs) have also provided a way for groups of people to associate around a topic. Through the use of web server programming, the idea of discussion groups and discussion threads has been extended to provide users with the ability to subscribe to secured discussion forums that are, in some cases, moderated by other users.

Another variant of Internet based communication forums are the web-based "social network" applications, in which a number of users are able to find each other's' accounts and voluntarily become "friends" or "followers" of each other's posted messages. Users generally post brief messages about their status, mood, activities, and such, and their friends and followers can read and optionally reply to those messages. As such, friends may stay abreast of each other's' activities as a tool for maintaining their social bonds.

Some social networks provide tools for sharing information into or out of the social network. For example, some social networking websites provide a button that can be incorporated into third party web pages. When a user presses the button, information is passed back to the social networking website to indicate who pressed the button and on which web page the button was located. In such examples, the user's social networking peers can be notified about the user's activity on the third party web page.

SUMMARY

In general, innovative aspects of the subject matter described in this disclosure may be embodied in methods that include the actions of presenting, within a web page, a graphical representation of a content sharing interface of a first social networking service, the graphical representation including at least one button icon that is responsive to user input, receiving first user input to the button icon, in response to the first user input, expanding the content sharing interface within the web page to include an expanded content input area and a distribution interface, the expanded content input area displaying a graphical representation of digital content that is to be distributed, receiving second user input to the distribution interface, the second user input indicating one or more contacts to which the digital content is to be distributed, in response to receiving the second user input, displaying one or more icons within the distribution interface, each icon of the one or more icons being a graphical representation of the one or more contacts, receiving third user input to the content sharing interface, the third user input including a user instruction to distribute the digital content, and in response to the third user input, transmitting a post data set to the server computing system, the post data set including digital content data and distribution data.

These and other implementations may each optionally include one or more of the following features. For instance, an icon of the one or more icons corresponds to a social circle of the user within a social networking service, the social circle defining a subset of the one or more contacts; an icon of the one or more icons corresponds to a second social networking service that the user participates in; the second social networking service includes a micro-blogging social networking service; the second social networking service includes a blogging service; an icon of the one or more icons corresponds to at least one contact that is to receive the digital content via email; actions further include displaying web page digital content within the web page, wherein the content sharing interface displays a summary of the web page digital content within the expanded content input area; actions further include displaying one or more digital content selection icons within the expanded content selection area; actions further include: receiving fourth user input, the fourth user input indicating a selection of an icon of the one or more digital content selection icons, and in response to receiving the fourth user input, displaying a digital content selection interface through which a user can select additional digital content for distribution; the one or more digital content selection icons comprise a digital image selection icon, a digital video selection icon, a link selection icon and a map selection icon; the one or more digital content selection icons are displayed in the content sharing interface prior to receiving the first user input; actions further include: receiving fourth user input, the fourth user input indicating a hover action over the button icon, and in response to the fourth user input, displaying a dialog box, the dialog box displaying data corresponding to contacts that have shared the digital content; the first user input includes user selection of the button icon; the web page includes a search results page and the button icon is associated with a search result displayed within the web page; the web page includes a mapping service web page and the digital content includes a map; the post data set further includes map data comprising scroll data and zoom data corresponding to a map view of the map, the scroll data and the zoom data being usable by the mapping service web page to replicate the map view; actions further include: receiving the post data set, generating an access control list (ACL) based on the distribution data, the distribution data corresponding to the one or more contacts, and distributing the digital content based on the ACL; the web page includes a web page of the social networking service; each of the plurality of web pages includes a web page of the social networking service; and the web page includes a web page of a website that is external to a domain of the social networking service.

Other implementations of this aspect include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 2A-2D depict an example content sharing interface in accordance with implementations of the present disclosure.

FIGS. 3A and 3B depict another example content sharing interface in accordance with implementations of the present disclosure.

FIGS. 4A-4D depict another example content sharing interface in accordance with implementations of the present disclosure.

FIGS. 6A-6B depict a screenshot of an example stream page for a user of a social networking service including an example content sharing interface.

FIGS. 10A-11 depict example output of an access control list (ACL) service in enforcing domain policies.

Like reference numbers represent corresponding parts throughout.

DETAILED DESCRIPTION

In general, implementations of the present disclosure are directed to content sharing interfaces that can be used to define a distribution of digital content. As used herein, a sharing user can include a user of a computing device that shares digital content with other users over a network (e.g., the Internet). As used herein, a receiving user can include a user that receives digital content shared by a sharing user. Receiving users can be associated with a sharing user in one or more contexts. In some implementations, the receiving users and the sharing user can be contacts of one another within a social networking service. In some implementations, the receiving users can be users that are contacts of the sharing user within an email service.

Content sharing interfaces, as discussed in further detail herein, are provided in association with various forms of digital content (e.g., uniform resource indicators (URIs), hyperlinks, maps, images, videos, files, social network posts, online articles, blogs). Users can interact with a content sharing interface to indicate that they wish to post the content associated with the interface, or a comment about the content, to contacts within a social networking service and/or contacts external to the social networking service.

Figure 1:
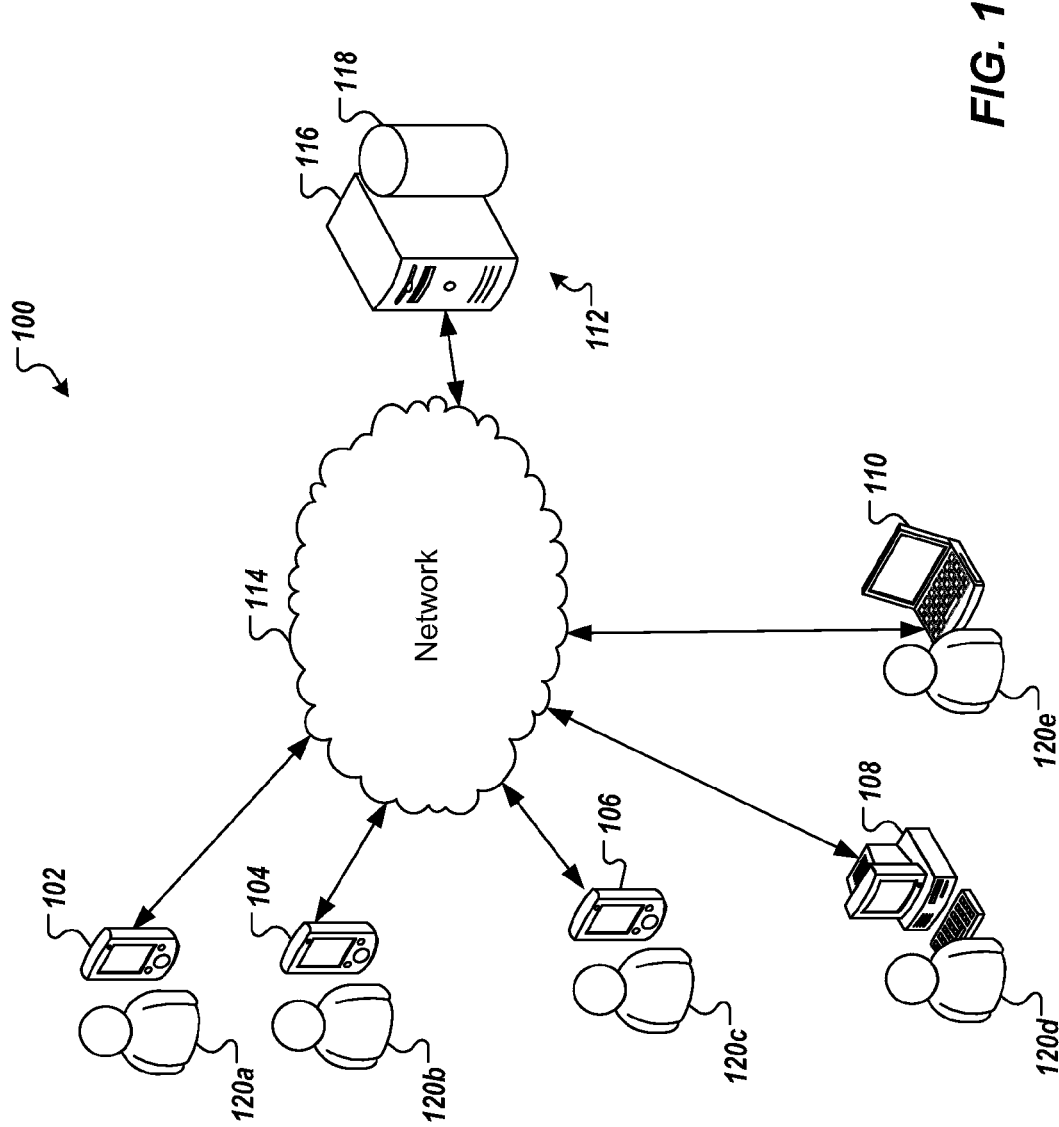
FIG. 1 depicts an example system that can execute implementations of the present disclosure.

FIG. 1 is a diagram of an example network architecture 100. The network architecture 100 includes a number of client devices 102-110 communicably connected to a server system 112 by a network 114. The server system 112 includes one or more processing devices 116 and one or more data stores 118. The processing devices 116 execute computer instructions (e.g., social network computer program code) stored in the data stores 118 to perform functions (e.g., of a social network server).

A number of users 120a-120e of the client devices 102-110, respectively, access the server system 112 to participate in a social networking service. For example, the client devices 102-110 can execute web browser applications that can be used to access the social networking service. In another example, the client devices 102-110 can execute software applications that are specific to the social network (e.g., social networking "apps" running on smartphones).

The users 120a-120e can participate in the social networking service provided by the server device 112 by posting information, such as text comments (e.g., updates, announcements, replies), digital images, videos, search results, a link to other digital content (e.g., a uniform resource locator (URL) linking to a digital video and/or digital images) and/or other appropriate digital content. In some implementations, information can be posted on a user's behalf by systems and/or services external to the social network or the server system 112. For example, the user 120a may post a review of a movie to a movie review website, and with proper permissions that website may cross-post the review to the social network on the user's 120a behalf. In another example, a software application executing on a mobile device, with proper permissions, may use global positioning system (GPS) capabilities to determine the user's location and automatically update the social network with the user's location (e.g., "At Home", "At Work", "In Brownsdale, Minn.").

Users 120a-120e interacting with the client devices 102-110 can also use the social network provided by the server system 112 to define social circles to organize and categorize the relationships to other users. Such relationships can be defined using social circles. In some implementations, a social networking service enables a user to group contacts into one or more social circles, which can be based on categories of relationships of a user to other users. The relationship can be implicit or explicit. For example, and within the context of a social networking service, a user can assign contacts to one or more social circles to better control the distribution and visibility of social networking posts and/or other digital content. In some implementations, a social circle is provided as a data set defining a collection of contacts that are associated with a user of a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries, all of the members of the social circle may be familiar with one another, and permission may be required for a member to join a social circle. For example, a user of the social networking service define a social circle, and the social circle, as a data set defining a collection of contacts, may reflect a real-life social circle of the user.

Users of a social networking service may wish to share information with social networking peers. However, users may also wish to have control over distribution of such information among their social networking peers. For example, some users may have concerns about their privacy when posting information. Such users may wish to keep posts about their personal activities restricted from their professional social circles. For example, a user can post pictures of his softball team to his "friends" and "softball team" social circles, but not to a "co-workers" social circle. Other users may wish to target the information they post so it reaches substantially only selected subsets of their contacts. For example, a user may wish to post family announcements substantially only to a "family" social circle, or may wish to post political comments substantially only to a "politics" social circle.

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server system 112 can include a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

FIGS. 2A-2D depict an example content sharing interface 200 in accordance with implementations of the present disclosure. As discussed in further detail herein, the content sharing interface 200 can be presented to a user of a social networking service within the social networking service (e.g., the content sharing interface 200 is displayed within a web page of a website of the social networking service), and/or external to the social networking service (e.g., the content sharing interface 200 is displayed within a web page of a website that is not directly associated with the social networking service).

The content sharing interface 200 enables users to post digital content for distribution of the digital content to a defined set of recipients. In some embodiments, a post can be generated by the user and can include an underlying post data set. The post data set can include data associated with the digital content and the identified recipients. In some implementations, the post data set can include the digital content, timestamp data (e.g., a timestamp indicating the time that the post was generated), distribution data (e.g., contacts, one or more social circles, etc.), and identification (ID) data (e.g., an ID assigned to the post data set upon generation of the post). In some embodiments, the distribution data is processed to provide an access control list (ACL) that specifies the distribution of the digital content (e.g., which contacts within or without the social networking service are granted access to the digital content).

In some embodiments, a distribution hub can be provided as a backend service (e.g., provided by the server system 112 of FIG. 1). In some implementations, an ACL service can be executed to provide the distribution hub and to enforce visibility of distributed digital content. In some examples, the ACL service can be provided as one or more computer program applications that can be executed by one or more server systems. The ACL service can generate the ACL and can determine end points, to which the post data set is to be distributed based on the ACL. In some implementations, the contacts that are authorized to access or otherwise receive the digital content are determined based on the ACL. The ID of the post data set can be written to a per user/view index at the ACL service. When fetching posts to distribute to a particular user, the user/view index is accessed and the IDs of the various posts that the user is authorized to view are determined. The post data sets are retrieved from a data store (e.g., data store 118 of FIG. 1) and are transmitted for display on a client computing device associated with the particular user.

In implementations of the present disclosure, a distribution for digital content can be defined based on one or more social circles. As used herein, a distribution can include a list of one or more contacts, to which digital content is to be distributed using the social networking service. In some examples, a distribution includes one sub-distribution (e.g., one social circle is identified for distribution of the digital content). In some examples, a distribution includes a plurality of sub-distributions. In some implementations, a sub-distribution can include a contact that is not a member of a particular social circle and/or is not a user of the underlying social networking service.

The content sharing interface 200 includes distribution interface 202 that is associated with digital content providing in a content area 204. In various embodiments, the digital content can be a uniform resource indicator (URI), a web page, a subsection of a web page, a media playback interface, a hyperlink, a social network post (e.g., text), an online map, a location on an online map, a digital image, a digital video, search results and/or any other appropriate item or information that can be represented in an electronic user interface (UI).

The distribution interface 202 includes a contact input area 206. As will be discussed in further detail below, the user can type or otherwise select identifiers to input into the contact input area 206. The identifiers identify other users, categories of users and/or social circles to define distribution of the digital content (e.g., through a social network service). In some implementations, the identifiers can include contact identifiers, social circle identifiers, email addresses, or any other appropriate identifier than can be used to identify one or more persons with whom content can be shared. The identifiers provided in the contact input area 206 are used to generate an ACL that defines distribution of the digital content provided in the content area 204.

Referring now to FIG. 2B, an example identifier icon 208 is provided in the distribution interface 202. The identifier icon 208 is a visual representation of one or more users that digital content is to be shared with. In the example of FIG. 2B, a user has tentatively indicated that digital content within the content area 204 is to be shared with members of a "friends" social circle. Until the post is committed, discussed in further detail below, identifier icons provide a tentative distribution for the digital content. For example, and continuing with the example of FIG. 2B, the user can activate (e.g., click on) a delete control 210 to remove the identifier icon 208 from the contact input area 206.

Referring now to FIGS. 2C and 2D, a menu 213 can be presented in response to user input. In some implementations, the user can select (e.g., click on) the contact input area 206 and the menu 213 is displayed in response to the selection. In some implementations, the user can input text into the contact input area 206 and the menu 213 is displayed in response to the input. In some implementations, the user can select (e.g., click on) an add control 214 and the menu 213 and the menu 213 is displayed in response to the selection. In the illustrated example of FIG. 2C, the menu 213 includes multiple regions. A menu region 220 displays a collection of social circles 222 that the user can select from. The social circles can include social circles that the user has defined using a social networking service. In some implementations, the collection of social circles 222 may include a subset of the user's most commonly targeted social circles and/or a subset of the user's most populated social circles. A user control 224 can be selected to display additional social circles that are managed by the user. By selecting (e.g., clicking on) a social circle from the listed social circles, a corresponding identifier icon 208 can be displayed in the contact input area 206.

A menu region 230 presents a collection non-circle specific contact groups that the user can select to distribute the content to. For example, by selecting "My circles," the user can choose to share the digital content with anyone who is in any of the user's social circles. By selecting "Extended Circles," the user can choose to share the digital content with anyone in the user's extended network (e.g., friends of friends, other users who share a public social circle with the user). By selecting "Anyone," the user can choose to share the digital content with anyone (e.g., the general public) over the Internet. By making a selection (e.g., clicking on) from the menu region 230, a corresponding identifier icon 208 can be displayed in the contact input area 206. In some examples, the menu region 230 can include one or more domains, to which the user can share digital content. In the depicted example, a domain "Domain" is provided. An example domain can include a domain of an Internet-based service provider (e.g., Google Inc.). One or more domains can be identified in the distribution interface, and the digital content can be shared with all users that interact with the specified domain(s).

A menu region 240 presents a collection of the user's most recently used distribution lists. In some implementations, the menu region 240 may not be displayed. For example, new users may have never used the content sharing interface 200 previously, and therefore may have no previously used distribution lists to choose from. As the user uses the content sharing interface 200, the number of items displayed in the menu region 240 can expand up to a predetermined number of most recently used distribution lists.

With specific reference to FIG. 2D, the selections available in the menu 213 can be adapted based on text input into the contact input area 206. In the illustrated example, the user has begun entering freeform text 250 into the contact input area 206 in the form of the letter "f" (i.e., as the freeform text 250). In response to this input, a menu region 260 adapts to suggest several targets that may correspond to the user's entry of the letter "f," such as a "family" social circle 262, and a "Francisco Franco" contact 264. In some implementations, users of another social network service can be targeted. For example, a "Friendworks (Rob McDavies)" contact 266 can be presented in order to target a user of another social networking service.

In some implementations, the user can indicate that the digital content is to be distributed to contacts via email. In some examples, sharing digital content via email can be instead of or in addition to sharing the digital content through the social networking service. In some implementations, the user can interact with an identifier icon (e.g., the identifier icon 208) provided in the distribution interface (e.g., the distribution interface 202) to provide user input instructing that the associated digital content is to be shared via email. In some examples, the user interaction can include hovering over an identifier icon (e.g., using a pointer) and, in response to the hover action, a menu associated with the particular identifier icon can be displayed. The menu can include a menu option indicating that the contacts associated with, or otherwise represented by the particular icon identifier are to receive the digital content via email.

Once the user has defined and is satisfied with the distribution, the user can commit the post. In some implementations, a share button 212 is provided. The user can activate (e.g., click on) the share button 212 to commit the post. Committing of the post can cause operations to be performed to generate the post data set and distribute the digital content to the identified users, as discussed above.

FIGS. 3A and 3B depict another example content sharing interface 300 in accordance with implementations of the present disclosure. Referring to FIG. 3A, the content sharing interface 300 includes a content entry area 305. In some implementations, the content input area 305 can be the content area 204 of FIGS. 2A-2D. In some implementations, the user can select the content input area 305 to input and/or select digital content for distribution. For example, a pointer 310 can be used to interact with (e.g., click on) the content input area 305 and initiate an interaction with the content sharing interface 300. For example, the user can click on the content entry area 305 to initiate the entry of text as part of an interaction with the content entry area 305.

In some implementations, the user can select an icon 315, 320, 325, 330 to initiate input and/or selection of digital content that is to be distributed. In the illustrated implementation, for example, the user can select an icon 315 to initiate a process for selecting a digital image (e.g., stored in computer-readable memory) to be distributed. For example, the user can click on the icon 315, and, in response to the click, a user interface can be presented in which the user may be able to upload a digital image file, select a digital image file that was previously uploaded, and/or provide a URL corresponding to a digital image found elsewhere on the Internet. In some implementations, once a digital image file has been identified, a thumbnail of the digital image and/or information about the image (e.g., address, filename, caption, title, size, date taken) may appear in the content input area 305.

In the illustrated implementation, for example, the user can select an icon 320 to select a digital video (e.g., stored in computer-readable memory) to be distributed. For example, the user can click on the icon 320, and, in response to the click, a user interface can be presented in which the user may be able to upload a digital video file, select a digital video file that was previously uploaded, and/or provide a URL corresponding to a digital video file found elsewhere on the Internet. In some implementations, once a digital video file has been identified, a thumbnail frame capture of the digital video and/or information about the digital video (e.g., address, filename, description, title, size, date taken) may appear in the content input area 305. In some implementations, shared content may be accompanied by information other than a URL or other identifier. For example, the user may click on the icon 320 to share an identified video as shared content. The shared content can include not only an identifier of the video content, but also a playback start point and duration. In such an example, the user can share a subsection of the identified video with his targeted contacts.

In the illustrated implementation, for example, the user can select an icon 325 to provide a hyperlink (e.g., to a URL) for distribution. For example, the user can click on the icon 325, and, in response, a user interface can be presented in which the user may be able to type or paste in a uniform resource locator (URL) of a web page that the user intends to share. In some implementations, once a URL has been identified, a thumbnail preview of the identified page and/or information about the page (e.g., URL, website, page title, a thumbnail of a photo selected from the identified page) can be displayed in the content input area 305.

In the illustrated implementation, for example, the user can select an icon 330 to select a map location for distribution. For example, the user can click on the icon 330, and, in response, a user interface can be presented in which the user may be able to identify a place (e.g., business, landmark, facility, city) and/or a geographic location (e.g., physical address, latitude and longitude) that the user intends to share. In some implementations, once a location has been identified, a thumbnail map of the identified location and/or information about the location (e.g., URL, physical address, place name, a thumbnail of a photo of the identified place) can be displayed in the content input area 305.

In some implementations, when the icon 330 is activated, a user interface can be presented to provide the user with a collection of suggested places. For example, by activating the icon 330, a process can be initiated in which the user's current location can be determined, and that location information can be used to search for and identify a list of nearby places that the user may wish to share. In some implementations, by activating the icon 330, a process can be initiated in which a content item or content provided by the user can be analyzed to identify one or more places that may be associated with the content. For example, the user may enter text including "Honeymoon at Mt. Rushmore" and then click on the icon 330. In response, a process may be initiated to analyze the entered text and suggest "Mt. Rushmore National Monument" and/or "Rushmore Honeymoon Cabins" as suggested locations that can be included as part of the digital content that is to be distributed.

With particular reference to FIG. 3B, the content sharing interface 300 can expand to include a distribution interface 340 and a share button 342. In some implementations, the distribution interface 340 and the share button can be displayed in response to user activity (e.g., clicking on) with the content input area 305 including activity with one or more of the icons 315-330. In some implementations, the content input area 305 also expands to provide additional room for input of digital content. The distribution interface 340 and the share button 342, and the functions thereof, correspond to the distribution interface 202 and the share button 212 of FIGS. 2A-2D, as discussed in detail above.

In some implementations, multiple digital content can be input to the content input area 305 for distribution. For example, the user can click on the icon 315 to add a digital image, click on the icon 330 to add a location (e.g., where the image was taken), and type a text description into the content input area 305. In response to committing the post (e.g., by clicking on the share button), operations are performed to generate the post data set and distribute the digital content to the identified users, as discussed above. In this example, the digital content of the post data set would include the digital image, the location and the text.

Figure 4D:
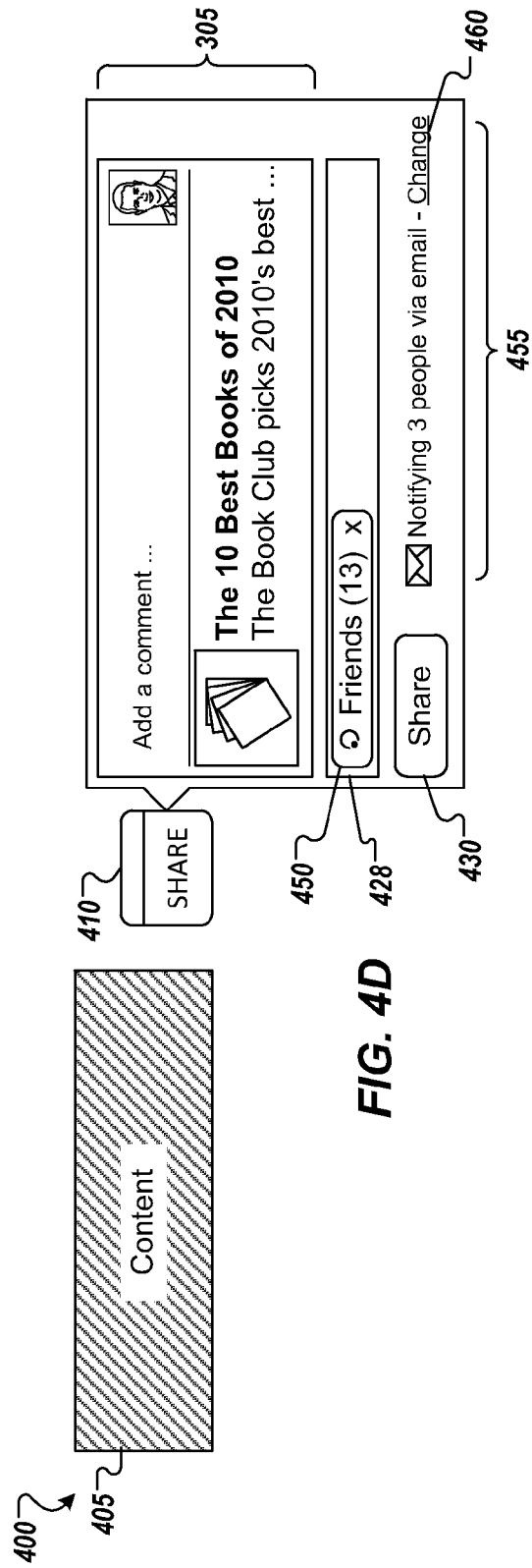

FIGS. 4A-4D depict another example content sharing interface 400 in accordance with implementations of the present disclosure. Referring to FIG. 4A, the content sharing interface 400 includes a content item 405 and a share button 410. In some implementations, the content item 405 can be digital content that is displayed on a display. Example content items can include one or more search results, a published article, a blog, a post to a social networking service, a digital image, a digital video, an audio file and/or any other appropriate digital content. For purposes of discussion, the example content item 405 can include an article that is published to a web page of a website. In this example, the share button 410 can be displayed within the web page adjacent to, or otherwise in the vicinity of the content item 405. In this manner, the share button 410 is at least visually associated with the content item 405. In some implementations, HTML, JavaScript and/or any appropriate programming code can be used to generate and display the share button 410 within the web page, and/or provide metadata that identifies the content item 405 as being associated with the share button 410.

Referring now to FIG. 4B, a pointer 415 can be provided to enable a user to select various components displayed on the display. In the example of FIG. 4B, the pointer 415 is illustrated as hovering over the share button 410 (e.g., movement of the pointer 415 pauses on the share button for a predetermined time). In response to this user action, a display region 420 can be presented. The display region 420 displays information regarding a sharing status associated with the content item 405. In the illustrated example, the display region 420 indicates that the content item 405 has been previously shared by a user 422a and a user 422b. In some implementations, the users 422a, 422b identified in the display region 420 correspond to contacts of the user within a social networking service, can be contacts of the user within an email service, and/or can be users that have some connection to the user (e.g., a friend of a friend in a social networking service).

Referring now to FIG. 4C, the user can select (e.g., click on) the share button 410 to share the content item 405 with other users. In response to the user selection of the share button 410, the display region 420 expands to display a content area 426, a distribution interface 428 and a share button 430. The content area 426, the distribution interface 428 and the share button 430, and the functions thereof, correspond to the content area 204, distribution interface 202 and the share button 212 of FIGS. 2A-2D, as discussed in detail above. The content area 426 can include a content input area 432 and a content summary area 434.

As discussed in further detail herein, the content input area 432 can be used to input digital content and the content summary area 434 can display a summary of the content item 405 that is to be shared. In the illustrated example, the content item 405 includes a published article (e.g., "The 10 Best Books of 2010"). The content summary area 434 is pre-populated with a summary 436 of the content item 405. In the illustrated example, the summary 436 comprises a thumbnail image 435, a title of the article (e.g., "The 10 Best Books of 2010" and a brief description 440 of the article. The content input area 426 provides an interface with which the user can interact to add textual comments regarding the content item 405. For example, the user may add a comment such as "I have read five of these books, how many have you read?" when sharing the article entitled "The 10 Best Books of 2010."

In some implementations, the brief description 440 of the article can be a pre-stored summary of the article and/or the first few words or sentences of the article. In some examples, user activation (e.g., clicking on) the share button 410 initiates a call to a source document (e.g., a web page document) that includes the article. In some implementations, a pre-stored summary of the article is provided in response to the request. In some implementations, an ad hoc summary is generated and the summary is returned for display as the brief description 440. In some examples, an ad hoc summary can be generated using a script that crawls the source document and that extracts data (e.g., text, images) from the source document and generates the summary based thereon. In some examples, an ad hoc summary can be generated by one or more server systems used to host the source document (e.g., web site that includes the web page) in response to a request (e.g., a request that is automatically generated and transmitted in response to user action on the share button 410).

As discussed above with respect to the distribution interface 202 of FIG. 2, the user can define a distribution of the shared content item 405 using the distribution interface 428. With particular reference to FIG. 4D, an example identifier icon 450 is provided in the distribution interface 428. In the illustrated example, the identifier icon 450 corresponds to a "friends" social circle of the user and indicates that there are thirteen contacts in the user's "friends" social circle, with which the content item 45 will be shared. In some implementations, a notification type indicator 455 can be provided to display information that indicates the manner in which the content item will be shared with subgroups of the user's contacts. In the illustrated example, of the thirteen contacts in the "friends" social circle, three of those contacts will receive a share notification through email. In some implementations, a change control 460 can be provided and can be associated with the notification type identifier 455. In some implementations, the change control 460 can be activated to display a notification change user interface (not shown). For example, the notification change user interface can include options such as to email people who are not also members of the user's social networking service, to not use email to notify other users, or to specify contacts to send an email to. In some implementations, the summary can be edited by the user prior to sharing. For example, the user can enter and/or edit text to the summary and/or can add and/or other digital content as discussed herein.

Figure 5A:
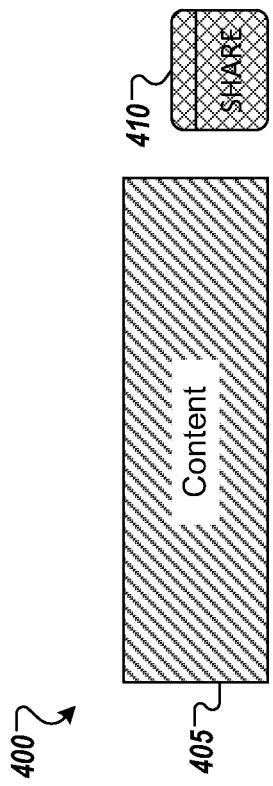
FIGS. 5A and 5B depict an implementation of the example content sharing interface of FIGS. 4A-4D.
Figure 5B:
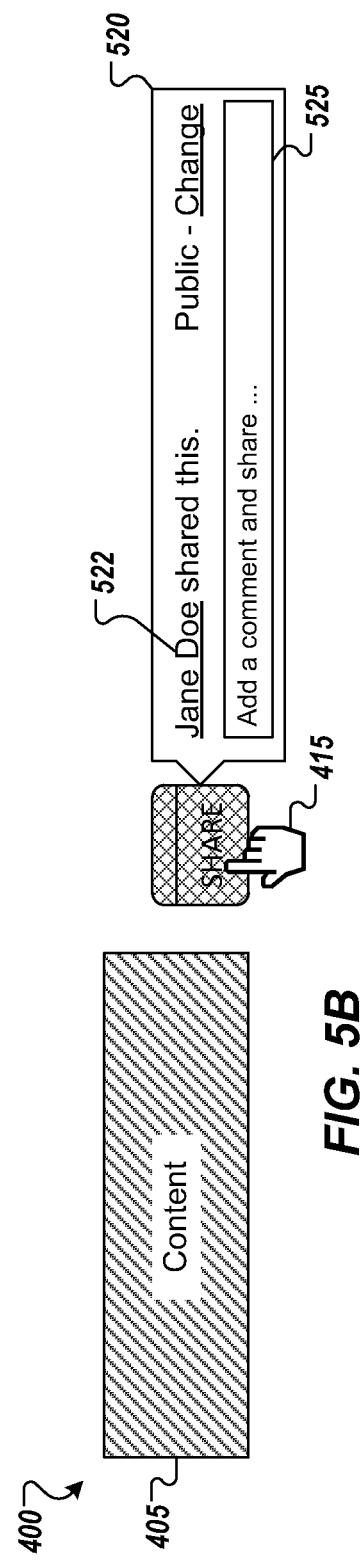

FIGS. 5A and 5B depict an implementation of the example content sharing interface 400 of FIGS. 4A-4D. FIG. 5A illustrates an example of the content sharing interface 400 as it would appear to the user, after the user has used the share button 410 to share the content item 405. The share button 410 appears visibly altered after the content item 405 has been shared, as compared to the appearance of the share button 410 before the user shared the content item 405. For example, the share button 410 may initially be displayed as implementing a first color scheme before sharing and second color scheme after sharing. In some implementations, the user may share information about the content item 405 by clicking the share button 410 and taking no further action. For example, clicking on the share button 410 without entering a comment or associating any other content with the shared information may be used to indicate that the user liked or has otherwise approved or endorsed the content item 405.

Referring now to FIG. 5B, the user hovers the pointer 415 over the share button 410. In response to this action, a display region 520 is displayed. The display region 520 displays information regarding the sharing status of the content item 405. In the illustrated example, the display region 520 indicates that the content item 405 has also been shared by a user 522 ("Jane Doe"). A comment area 525 is also provided for the user to enter a comment about the content item 405. This can be in addition to a comment already provided by the user when originally sharing the content item.

As discussed in further detail herein, content sharing interfaces can be implemented across various contexts. As some examples, content sharing interfaces can be provided within a social networking service (e.g., on a web page of a social networking website), in a search results page, within a mapping service (e.g., on a web page of a mapping website), embedded within web pages and being associated with particular content within a web page (e.g., an article published on a news service website). In some implementations, a content sharing interface can be provided as a surf-along window in a web browser that is executed on a client computing device. In such implementations, for example, the content sharing interface can be consistently present as the user switches between various web pages and content displayed within the web browser can be shared using the content sharing interface. Although the content sharing interfaces are illustrated and discussed within various example contexts, it is contemplated that the content sharing interfaces can be used in other contexts not specifically discussed herein.

Figure 6A:
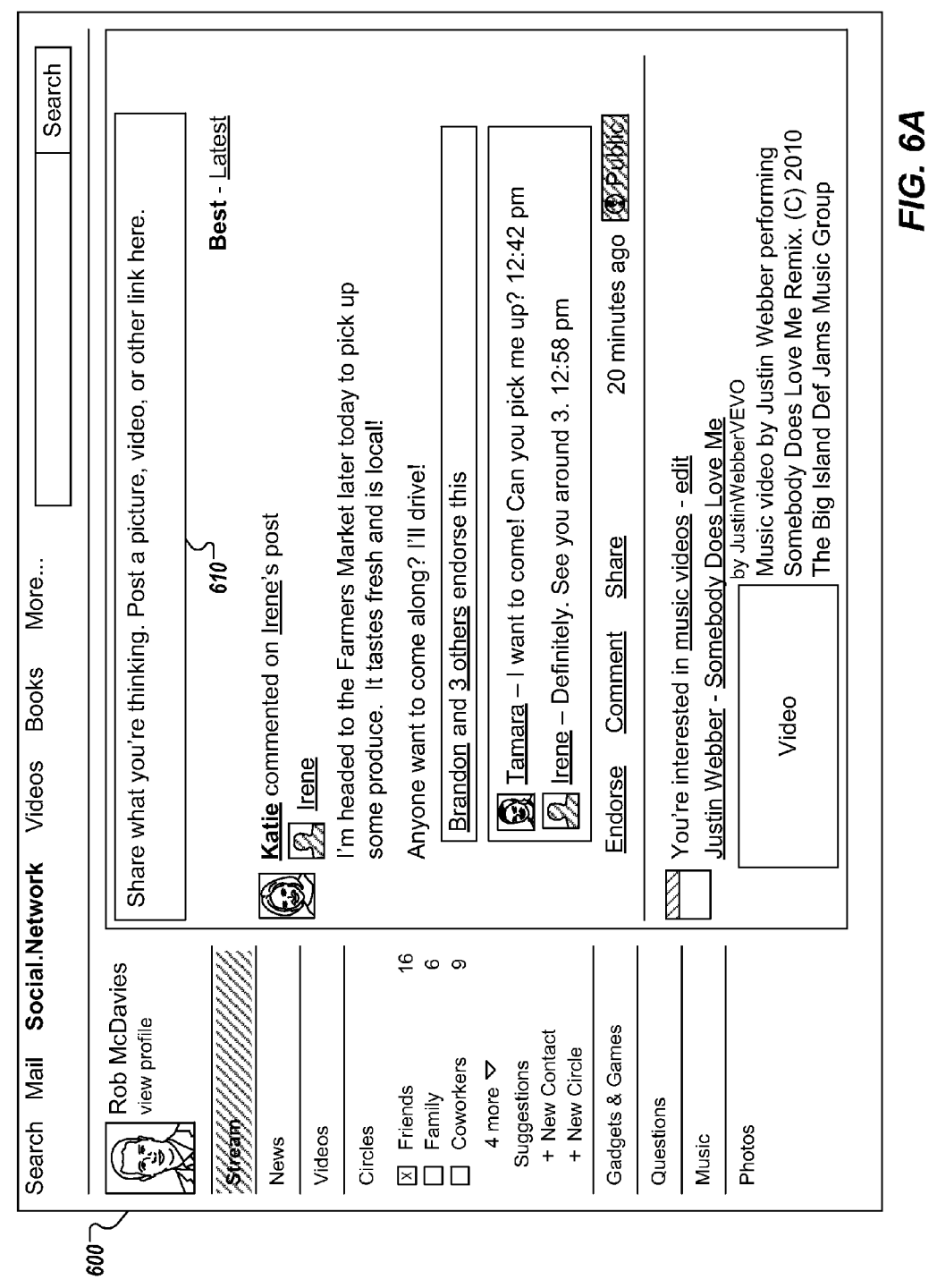

FIG. 6A depicts a screen-shot of an example stream page 600 provided within the context of an example social networking service. For example, the stream page 600 can be provided as a web page within a website of a social networking service, and can display digital content that has been shared with a user associated with the stream page 600. In the illustrated example, the user includes "Rob McDavies" and the stream page 600 displays digital content that other users have shared with the user and/or digital content that the user has shared with other users.

Among other features provided in the stream page 600, the stream page includes a content sharing interface 610. Although the content sharing interface 610 is displayed on the stream page 600 in the illustrated example, it is appreciated that the content sharing interface 610 can be displayed on particular web pages or all web pages of the social networking service. In this manner, the content sharing interface 610 can be available to the user on any web page and the user is not required to go to a particular web page to share digital content. The user can activate (e.g., click on) the content sharing interface 610 to share digital content.

Figure 6B:
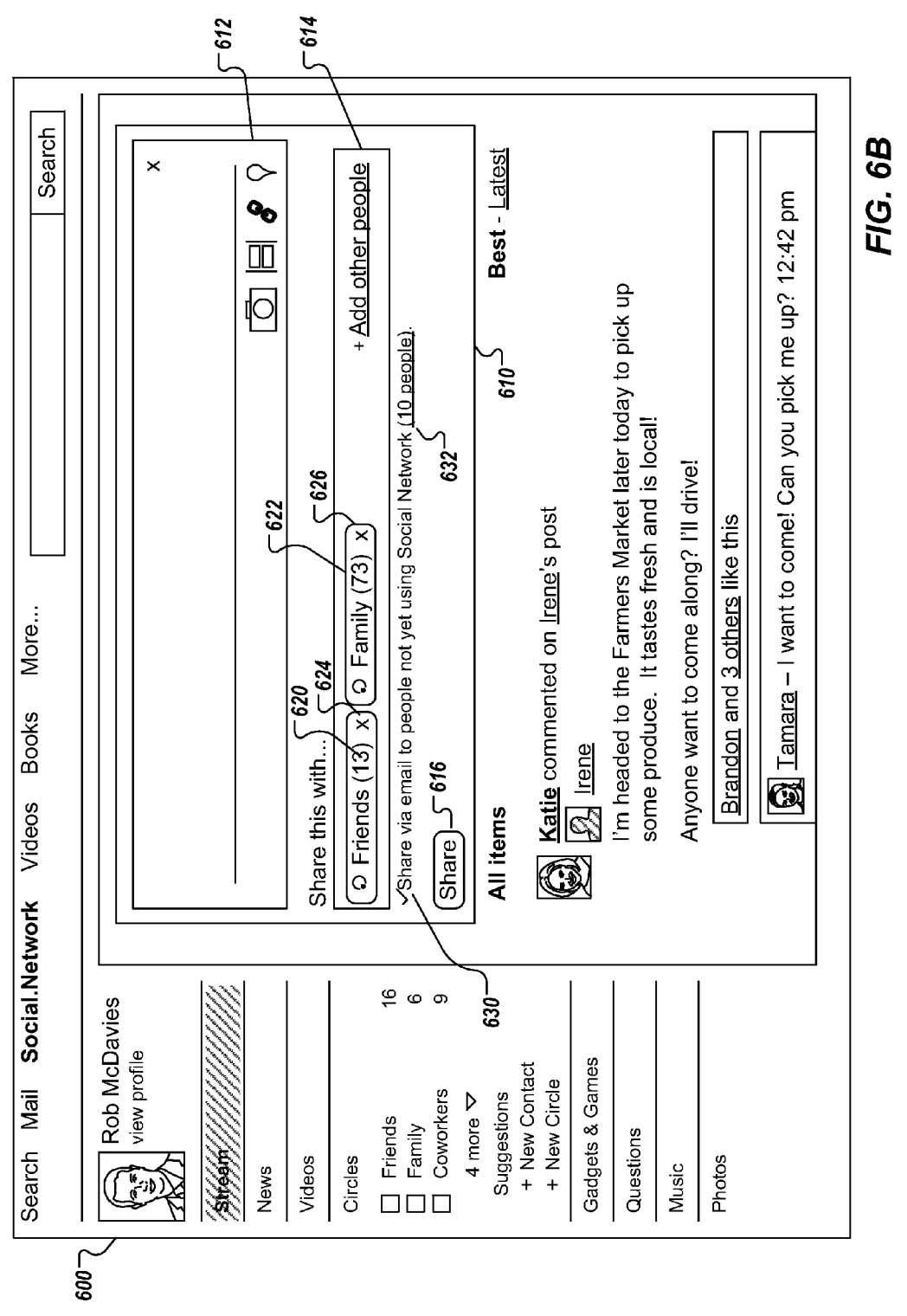

FIG. 6B depicts another screen-shot of the example stream page 600. In the illustrated example, the user has clicked on the content sharing interface 610 and the content sharing interface 610 expands to include content input area 612, a distribution interface 614 and a share button 616. The content input area 612, the distribution interface 614 and the share button 616, and the functions thereof, correspond to the content input area 305, the distribution interface 340 and the share button 342 of FIGS. 3A and 3B, as discussed in detail above.

In the illustrated example, an example identifier icon 620 and an example identifier icon 622 are provided in the distribution interface 614. As discussed above, the identifier icons 620, 622 are each provided as a visual representation of one or more users that digital content is to be shared with. In the example of FIG. 6B, a user has tentatively indicated that digital content within the content input area 612 is to be shared with members of a "friends" social circle and with members of a "family" social circle. Until the post is committed the identifier icons 620, 622 provide a tentative distribution for the digital content. For example, the user can activate (e.g., click on) a delete control 624, 626 of the respective identifier icons 620, 622 to remove the identifier icons 620, 622 from the distribution interface 614.

In the example of FIG. 6B, a distribution for digital content provided in the content input area 612 can be defined by the social circles and/or contacts identified in the distribution interface 614. In the depicted example, a distribution is defined by a Friends social circle (graphically represented by the friends circle icon 620) and a Family social circle (graphically represented by the family circle icon 622). In this example, the distribution includes all of the contacts that are members of the Friends social circle and all of the contacts that are members of the Family social circle. The Friends social circle and the Family social circle can each be considered sub-distributions that define the overall distribution.

In some implementations, an email sharing control 630 can be provided. When activated (e.g., clicked on), the email sharing control 630 provides the user with a way to control whether or not the content will be shared with people who are not currently using the social networking service. For example, the email sharing control 682 can function as a toggle control that the user can click once to indicate that email should be used, and another click can indicate that email should not be used. An email count indicator 684 displays the number of people in the tentative distribution who would receive the shared content through email.

In some implementations, an auto-complete component provides auto-complete functionality that enables the user to type in part of the name of a social circle and/or individual contact to specify to which social circles and/or individual contacts the post content is to be distributed. In some implementations, the auto-complete functionality can be based on a contact ranking. For example, contacts and/or social circles can include an associated ranking score. Contacts having a higher ranking score are ranked higher than contacts having a lower ranking score. In some examples, auto-complete functionality can identify one or more contacts and/or one or more social circles based on text input into a distribution interface of a content sharing interface, discussed in further detail below. The one or more contacts and/or one or more social circles can be listed in rank order based on the ranking scores.

For example, the text input can include the letter "f" and the auto-complete functionality can identify the contacts "Farley" and "Frank" as contacts of the user, to which digital content can be distributed. The contact "Farley" can have a ranking score that is lower than a ranking score of the contact "Frank." The contacts can be displayed to the user for selection in rank order based on the ranking score. Consequently, and continuing with the instant example, the contact "Frank" can be listed higher on a list of contacts displayed to the user than the contact "Farley." In this manner, although the contact "Farley" could be listed first on an alphabetical basis, the contact "Frank" is instead listed first based on the ranking scores. As another example, the text input can include the letter "f" and the auto-complete functionality can identify the social circles "Family" and "Friends" as social circles defined by the user, to which digital content can be distributed. The social circle "Family" can have a ranking score that is lower than a ranking score of the social circle "Friends." The social circles can be displayed to the user for selection in rank order based on the ranking score. Consequently, and continuing with the instant example, the social circle "Friends" can be listed higher on a list of contacts displayed to the user than the social circle "Family." In this manner, although the social circle "Family" could be listed first on an alphabetical basis, the social circle "Friends" is instead listed first based on the ranking scores.

In some implementations, the ranking scores can be based on a popularity of contacts and/or social circles. For example, a contact that the user often shares digital content with may have a ranking score that is higher than a ranking score of a contact that the user rarely shares digital content with. Continuing with the example provided above, the contact "Frank" may receive digital content from the user more often than the contact "Farley." As another example, a social circle that is more often used to define distribution of digital content may have a higher ranking score than a ranking score of a social circle that is less often used to define distribution of digital content. Continuing with the example provided above, the social circle "Friends" may be used more often to define distribution of digital content by the user than the social circle "Family" (i.e., the user distributes content to the Friends social circle than the Family social circle).

In some implementations, the ranking scores can be based on a social vicinity of the user to the respective contacts. For example, a ranking score of a contact that is a direct contact of the user may be higher than a ranking score of a contact that is an indirect contact of the user. Continuing with the example provided above, the contact "Frank" can be a direct contact of the user (e.g., a friend) while the contact "Farley" is an indirect contact of the user (e.g., a friend of a friend).

In some implementations, the ranking scores can be based on a frequency of interaction via emails between the user and each respective contact. For example, the user can directly email each contact using an email service and a ranking score can be generated for each contact based on the email interaction. In some examples, the ranking score can be determined based on a number of emails sent from the user to a particular contact. In some examples, the ranking score can be determined based on a number of emails sent from the user to a particular contact over a particular time period. In this manner, frequency of email contact (i.e., number of emails per time period) is considered in the ranking score. In some examples, the ranking score can be determined based on the number of emails sent from the user to the particular contact and the number of emails sent from the particular contact to the user. In some implementations, each ranking score can be provided by an email service to the social networking service.

Continuing with the example provided above, the contact "Frank" can be in frequent email communication with the user, while the contact "Farley" is in less frequent email communication with the user. A ranking score corresponding to Frank and a ranking score corresponding to Farley can be provided to the underlying social networking service from an email service. Accordingly, text input to a content sharing interface can include the letter "f" and the auto-complete functionality can identify the contacts "Farley" and "Frank" as contacts of the user, to which digital content can be distributed. The contacts can be displayed to the user for selection in rank order based on the ranking score. Consequently, and continuing with the instant example, the contact "Frank" can be listed higher on a list of contacts displayed to the user than the contact "Farley."

In some examples, a character can be provided to the server as it is input by the user and the server can process the character, and any previously provided characters, to provide output for presentation to the user. For example, auto-complete functionality discussed herein can include character data being transmitted to the server as it is input by the user to the content sharing interface. In response, the server can generate output including one or more contact names and/or social circles that correspond to the input character data for presentation back to the user in a list of contact names and/or social circles, from which the user can select a particular contact and/or social circle.

As discussed above, a user can provide user input to a text region of a content sharing interface. In some implementations, the user input can include one or more trigger characters, each trigger character extending the distribution (i.e., the resulting ACL) of the user-provided digital content. For example, a trigger character can indicate that characters immediately following the trigger character define a contact, to which the digital content of the particular post should be distributed to. In some implementations, this is in addition to contacts and/or social circles identified in an associated distribution interface. In some examples, a trigger character can include the "@" character and/or the "+" character. The trigger character is immediately followed by a contact name. The trigger character and the contact name of a particular contact indicate, within the text of the particular post, that the post is to be distributed to the particular contact in addition to any other contacts and/or social circles that are input using an associated distribution interface.

In one example, a user can input the text "@Frank" (or "+Frank") in a text region (e.g., content input area 305 of the content sharing interface 300) as part of a textual post. For example, as part of a textual post, the user can input the text "@Frank and I are headed to Joe's Tavern to watch the playoffs" within a text region of a content sharing interface. The user can indicate that the textual post is to be distributed to a social circle (e.g., a Friends social circle) using a distribution interface associated with the content sharing interface (e.g., the distribution interface 340 of the content sharing interface 300). In response to the user sending the textual post for distribution using the social networking service (e.g., by clicking on a post button), an ACL is generated for the textual post, as discussed herein, and includes contacts of the user that are members of the social circle, as well as the contact Frank (who may or may not be a member of the social circle). Accordingly, the presence of the text "@Frank" in the text region results in distribution of the textual post to the contact Frank, even though the contact Frank might not be identified as part of the distribution defined using the distribution interface.

In some implementations, textual posts that include a trigger character can be distributed to contacts and can render with the trigger character absent. Continuing with the example above, the user can input the text "@Frank and I are headed to Joe's Tavern to watch the playoffs." Upon submitting the textual post, the post is distributed to the contact Frank, as well as any contacts and/or social circles defined using the distribution interface. When the contact Frank, and/or any other contacts that the post is distributed to, the post can be displayed as "Frank and I are headed to Joe's Tavern to watch the playoffs" with the "@" trigger character absent.

In some implementations, the contact name following the trigger character can be converted to hypertext and can provide a link to the contact's profile within the social networking service. Continuing with the example above, the user can input the text "@Frank and I are headed to Joe's Tavern to watch the playoffs." Upon submitting the textual post, the post is distributed to the contact Frank, as well as any contacts and/or social circles defined using the distribution interface. When the contact Frank, and/or any other contacts that the post is distributed to, the post can be displayed as "Frank and I are headed to Joe's Tavern to watch the playoffs" with the "@" trigger character absent and the text "Frank" having a hyperlink associated therewith. Action on the hyperlink (e.g., clicking on) can induce Frank's profile within the social networking service to be displayed to the user performing the action, subject to any privacy settings established by Frank.

In some implementations, text following a trigger character within a text region can be provided using auto-complete functionality discussed herein. Continuing with the example above, the user can initially type "@F" and, in response, a list of contact names can be presented to the user to select from to complete the contact name input. As also discussed herein, the contact names provided in the list of contact names can be in ranked order based on respective ranking scores.

In some examples, a server can analyze the submitted text and recognize the presence of a trigger character within the text. In response, the server can analyze the text immediately following the trigger character to identify a contact of the user that submitted the text and can add the contact to the ACL for distribution of the post. In some examples, a character can be provided to the server as it is input by the user and the server can process the character, and any previously provided characters, to provide output for presentation to the user. For example, auto-complete functionality discussed herein can include character data being transmitted to the server as it is input by the user to the content sharing interface. In response, the server can generate output including one or more contact names and/or social circles that correspond to the input character data for presentation back to the user in a list of contact names and/or social circles, from which the user can select a particular contact and/or social circle. In some implementations, the presence of a trigger character within the text region can trigger auto-complete functionality for selection of a contact name and/or social circle to immediately follow the trigger character.

Figure 7:
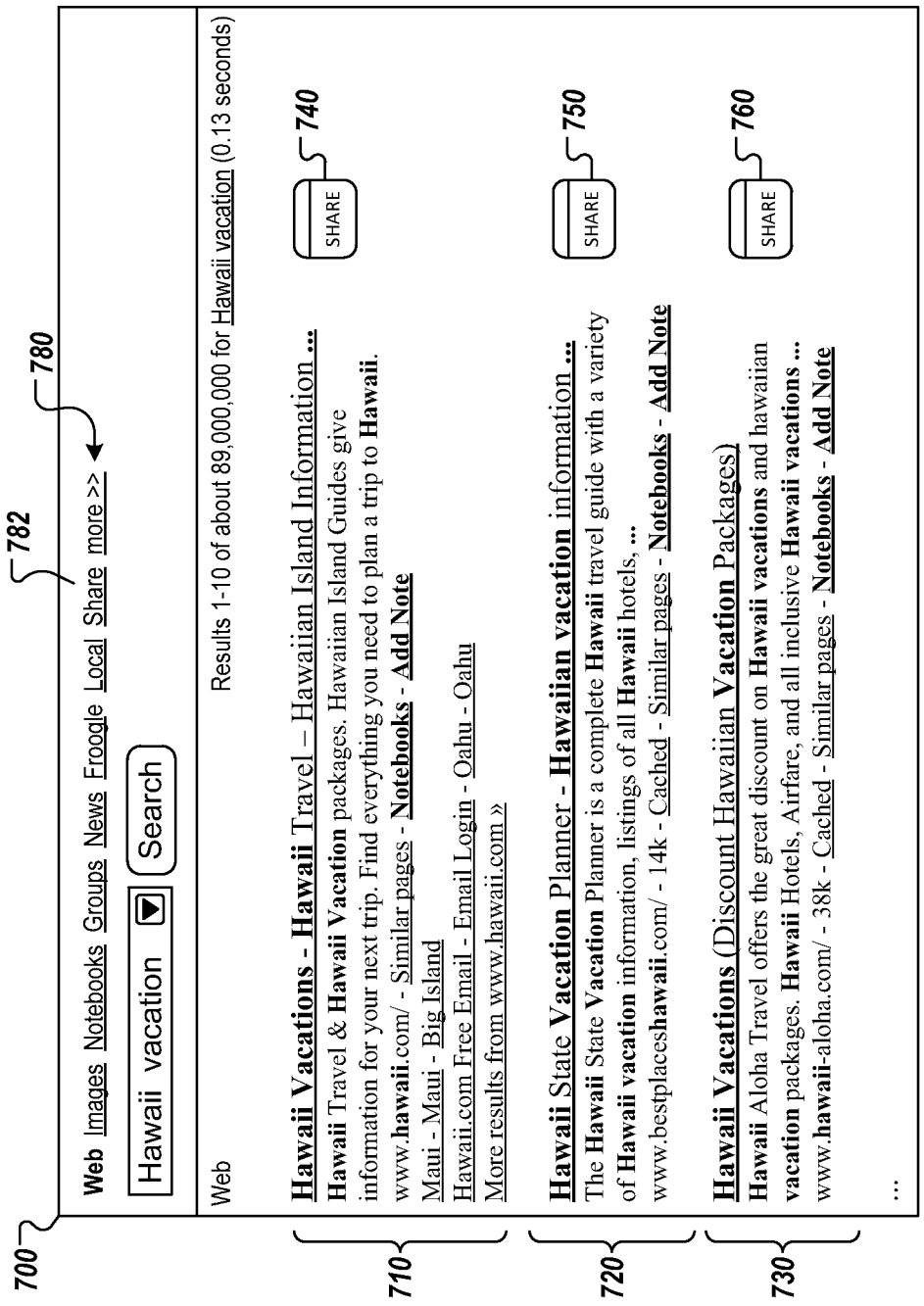
FIG. 7 depicts a screenshot of an example web page including example content sharing interfaces.

FIG. 7 depicts a screenshot of an example web page 700 including example content sharing interfaces. In the illustrated example, the web page 700 is provided as a search results web page. The web page 700 includes a collection of search results 710-730. In some implementations, each of the search results 710-730 can be provided as a content item such as the content item 405 of FIGS. 4A-4D.

Share buttons 740, 750, 760 can be embedded in the search results page, and each share button 740, 750, 760 can associated with a respective search result 710, 720, 730. In some implementations, HTML, JavaScript and/or any appropriate programming code can be used to generate and display the share buttons 740, 750, 760 within the search results page, and/or provide metadata that identifies the respective search result 710, 720, 730 as being associated with the share button 740, 750, 760. As discussed in detail with reference to FIGS. 4A-5B, a user viewing the search results page can activate the share buttons 740, 750, 760 to share a respective search result 710, 720, 730 as a content item. For example, the user can click on the share button 760 to open the display region 420, as described above with reference to FIG. 4C, and to a distribution for sharing the search result 730.

The example web page 700 further includes a so-called "sandbar" 780 displayed along a top edge of the web page 700. In the illustrated example, the sandbar 780 provides hypertext links to invoke other functionality. Although hypertext links are provided in the instant example, other types of links (e.g., icons, thumbnails) can also be provided. A "share" link 782 is provided and can be activated (e.g., clicked on) to invoke a content sharing interface. In some implementations, the content sharing interface 420 of FIG. 4D can be displayed in response to activation of the share link 782. The content sharing interface enables the user to share the entirety of the search results with other users as digital content. For example, a summary of the search results and/or a URL to the search results page(s) can be shared with users defined in the distribution. Although the sandbar 780 is displayed in the example web page 700, the sandbar can be a feature that is displayed on each of several web pages or all web pages viewed by the user.

Figure 8:
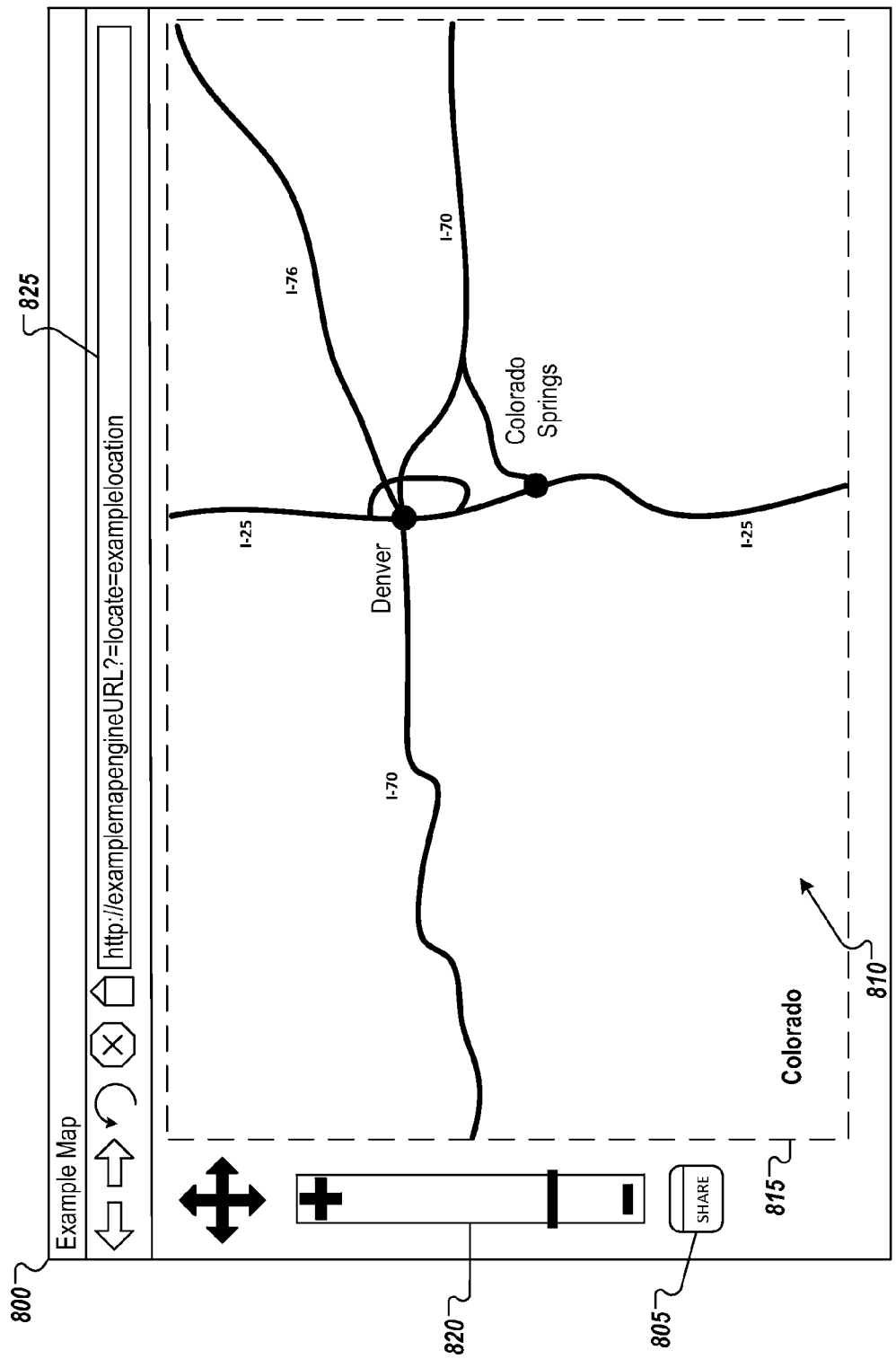
FIG. 8 depicts a screenshot of an example map page including an example content sharing interface.

FIG. 8 depicts a screenshot of an example map page 800 including an example content sharing interface 805 and a displayed map space 810. In some implementations, the content sharing interface 805 can be provided as a share button 410 and the map space can correspond to a content item 405 of FIGS. 4A-4D, discussed in detail above. The map space 810 can include a portion of a map selected by a map server, and can be displayed by a user interface, such as a web browser or mapping application. In some implementations, the map space 810 can be defined by a display region 815 and a zoom level 820. The display region 815 can include a portion of the user's display that is allocated to present the map space 810. In other implementations, the map space 810 can be further defined by a central point. The central point can be the location of interest (e.g., city center, destination, store location) or any other point within the map space 810 that serves as a reference point.

The display region 815 can vary according to a number of factors. Example factors include display device limitations, user preferences, and publisher preferences. In the example shown, the display region 815 is defined by the size and resolution of the display device. For example, a desktop computer with a 21 inch display and 1280×768 resolution can display more of a map than a web-enabled handheld device having a 3 inch display and 240×240 resolution. Accordingly, the map space 810 that is selected for presentation to different user devices can be different when the display region 815 and resolution of each user device is different.

Additionally, user preferences can affect the display region 815 available to present map spaces. User devices can have user preference settings that define the display region 815 and resolution. For example, a user device displaying a web page on a 21 inch display device can have a limited display region 815, if the application window containing the display region 815 is resized to occupy less than the entire display. Similarly, if the user device is displaying multiple windows within the 21 inch display or otherwise is not maximizing the window displaying the web page, the display region 815 may be limited. The user device can also be configured by the user to operate at a lower resolution than the maximum available resolution, resulting in less information being displayed.

Further, the display region 815 can vary according to publisher preferences. For example, publishers may design web pages to incorporate map spaces according to design specifications that enable a variety of information to be displayed on a single page (e.g., content, advertisements, links). Accordingly, the portion of each web page allocated for displaying the map space 810 may vary according to the display region defined in the design specifications and allocated by the publishers. For example, a publisher that publishes web pages dedicated to displaying maps may allocate a large portion of the web page as the display region 815, as shown in FIG. 8, while utilizing a small portion of the display for other information such as hyperlinks to other web pages. An example of a publisher that will allocate a large portion of the web page to displaying maps is a map service. In contrast, a publisher that publishes general content web pages my be more inclined to allocate a much smaller portion of the web page as the display region 815 since the map space 810 is only a portion of the information that the publisher is presenting.

The user can activate the share button 805 to share the particular map shown within the display region 815. In some implementations, by clicking on the share button 805, the user can share a URL 825 that links to the mapping service and provides instructions to display the map. In some implementations, however, the URL 825 may not accurately convey the central point of the map space 810 that is currently shown within the display region 815 and/or at the selected zoom level 820. For example, the map that is displayed within the display region may be the result of one or more pan and/or zoom operations invoked by the user. Therefore, in some implementations, activation of the share button 805 can cause an identification of the map area 810 (e.g., the URL 825) as well as metadata that describes the display region 815 and the zoom level 820 to be shared with other users as content. For example, a resulting post data set can include the URL and the metadata. When a receiving user, for example, clicks on the shared URL, the mapping service can be called and the metadata can be provided to the mapping service (e.g., through one or more application program interfaces (APIs)) to display the map to the receiving user exactly (e.g., with the same pan and zoom operations) as the sharing user viewed the map, when originally sharing the map.

In accordance with implementations of the present disclosure, a server-side computing device (e.g., the server system 112 of FIG. 1) can be used to serve one or more documents to one or more client-side computing devices (e.g., client devices 102-110). In some implementations, a document can include instructions that can be processed by a browser application executed on a client-side computing device to display a web page within a browser window. The instructions can include instructions to display a content sharing interface within the web page and to receive user input through the content sharing interface. In some implementations, the instructions can include instructions to associate digital content provided in the web page with the content sharing interface.

In accordance with implementations of the present disclosure, a server-side computing device (e.g., the server system 112 of FIG. 1) can be used to serve instructions to one or more client-side computing devices (e.g., client devices 102-110). In some implementations, the instructions can be processed by a browser application executed on the client-side computing device to display a content sharing interface within one or more web pages displayed by the browser and to receive user input through the content sharing interface. In some implementations, the instructions can include instructions to associate digital content provided in each of the one or more web pages with the content sharing interface.

In accordance with implementations of the present disclosure, a client-side computing device (e.g., e.g., client devices 102-110) can execute a content-sharing application to display a content sharing interface on a display of the client-side computing device. The content-sharing application can include instructions to display a content sharing interface within the display and to receive user input through the content sharing interface. The content-sharing application can correspond to a network of contacts associated with a user of the client-side computing device. In some implementations, the network of contacts can include contacts through an email service and/or contacts through a social networking service. In some examples, the content-sharing application can provide a content sharing interface that is displayed on a desktop screen of a client computing device. Consequently, a user of the client computing device can share digital content with contacts directly from the desktop screen, without accessing a social networking service website.

In some implementations, the content-sharing application can be provided as an add-on to other applications that can be executed using a computing device. In some examples, a productivity application (e.g., a word processing application, a spreadsheet application, a presentation application, an email application) can be executed to provide a graphical user interface (GUI) through which a user can perform tasks (e.g., create and/or edit a document, a spreadsheet, a presentation, and/or an email). The content-sharing application can be executed to provide a content sharing interface within the GUI of the productivity application. In this manner, a user can share digital content with contacts while working in the productivity application, without having to switch applications and/or accessing a social networking service website. It is appreciated that productivity applications are provided for purposes of example, and that the content-sharing application can be provided as an add-on to any other appropriate type of application (e.g., entertainment, gaming).

Figure 9:
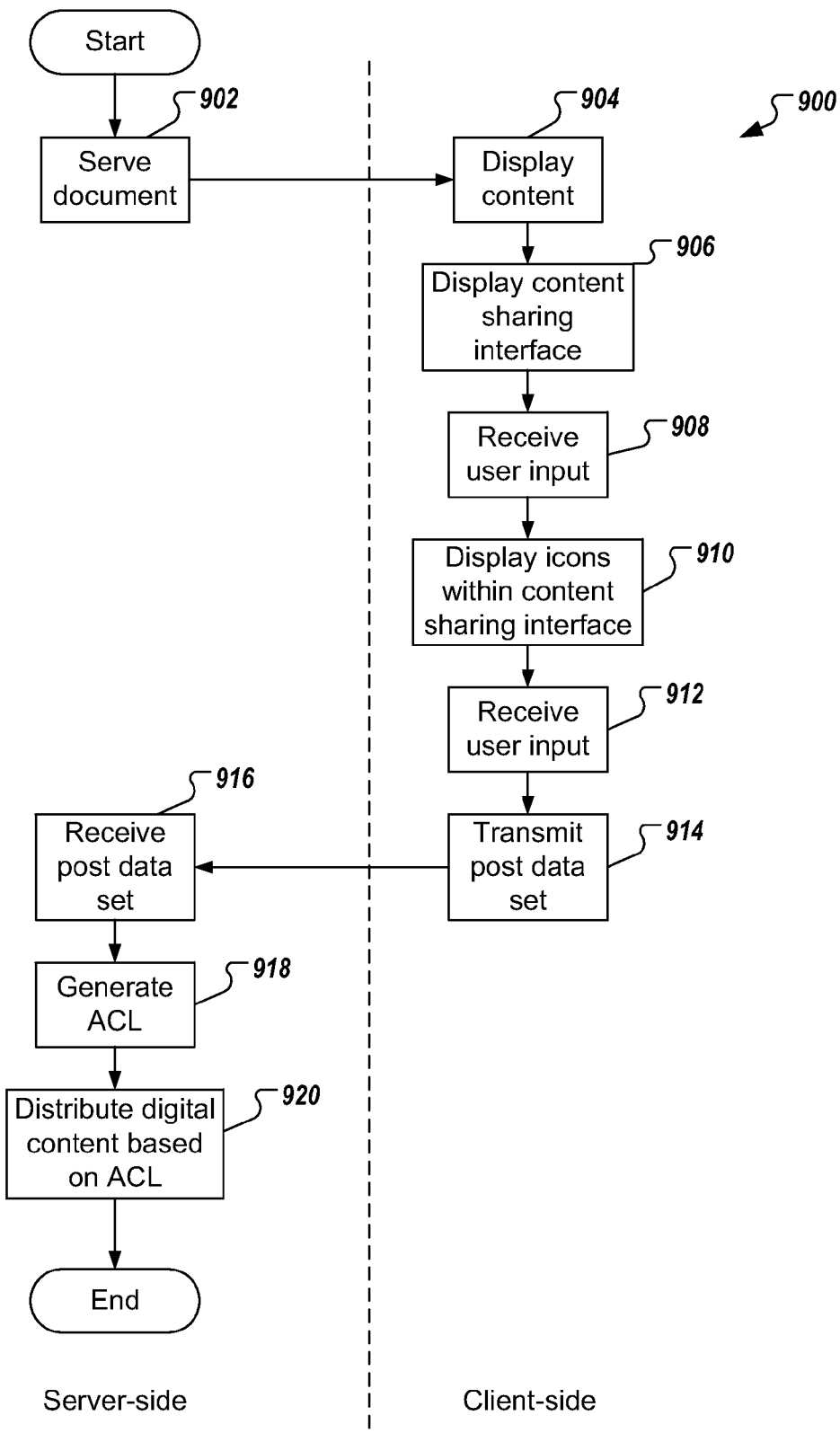
FIG. 9 is a flowchart illustrating an example process for sharing content.

FIG. 9 is a flowchart illustrating an example process 900 for sharing content. The example process 900 can be implemented using one or more program applications executed on one or more computing devices. In some implementations, one or more server systems (e.g., the server system 112 of FIG. 1) and one or more client computing devices (e.g., client devices 102-110 of FIG. 1) can perform operations of the example process 900.

A document is served (i.e., transmitted) to a client computing device (902). For example, the server system 112 serves the document to the client computing device 108. The document contains instructions for a browser application to perform client-side operations. For example, the client computing device 108 can execute a browser application that processes the instructions.

Digital content is displayed (904). For example, digital content can be displayed in a window of the browser application. A graphical representation of a content sharing interface is displayed (906). For example, the digital content can be displayed in a window of the browser application. User input is received to the content sharing interface (908). For example, the user 120d can provide input to the content sharing interface using the computing device 108. The user input indicates one or more contacts to which the digital content is to be distributed. One or more icons are displayed within the content sharing interface in response to receiving the user input (910). For example, the user input can be processed to identify the one or more contacts of the user. The one or more contacts can be contacts of the user within an email service and/or contacts within a social networking service. Each icon of the one or more icons being a graphical representation of the one or more contacts.

User input to the content sharing interface is received (912). The user input includes a user instruction to distribute the digital content. For example, the user input can be generated in response to the user clicking on a share button of the content sharing interface. Post data is transmitted to the server computing system in response to the user input (914). The post data set includes digital content data and distribution data. The post data set is received (916). For example, the server system receives the post data set. An access control list (ACL) is generated based on the distribution data (918). The distribution data corresponds to the one or more contacts. For example, the server system generates the ACL based on the distribution data. The digital content is distributed based on the ACL (920). For example, the server system can provide a distribution hub that determines end points, to which the digital content is to be distributed.

In some implementations, the example process 900 can include additional actions. In some examples, upon receiving user input that indicates one or more contacts to which the digital content is to be distributed, an ACL service can check the one or more contacts, groups of contacts and/or domains to which the digital content is to be distributed against one or more policies, as discussed below with respect to FIGS. 10A-12.

In some implementations, the ACL service, discussed above, can enforce one or more digital content distribution policies. Example distribution policies can include age policies and/or domain policies. For purposes of illustration, example domain policies will be discussed herein. In some examples, domain policies can include enabling users to distribute digital content to contacts that are not contacts within a particular domain or prohibiting users to distribute digital content to contacts that are not contacts within a particular domain. An example domain can include a domain of a provider of the computer-implemented social networking service. In some examples, an age policy can include prohibiting distribution of digital content to one or more contacts that are determined to be minors.

FIGS. 10A-11 depict example output of an access control list (ACL) service in enforcing domain policies. FIGS. 10A and 10B correspond to a domain policy that enables users to distribute digital content to contacts that are not contacts within a particular domain. However, and in accordance with the policy, users are warned that the digital content will be distributed to contacts outside of the particular domain. In some examples, and for purposes of illustration, a first domain can include a social networking service domain established by a provider of the social networking service, and a second domain can include an email service domain established by a provider of an email service.

With particular reference to FIGS. 10A and 10B, a user of the social networking service can provide input to a distribution interface 1000 to define distribution of digital content, as discussed in detail herein. One or more contacts and/or one or more social circles can be determined based on the user input. The determined contacts and/or social circles can be graphically represented within the distribution interface 1000, as discussed in detail herein. In the example of FIG. 10A, an "Anyone" icon 1002 graphically represents a first distribution, a "Soccer Club" icon 1004 graphically represents a second distribution and a "Friends" icon 1006 represents a third distribution. In the depicted example, the first distribution includes any user that accesses the Internet, indicating that the associated digital content will be visible to anyone via the Internet. The second distribution corresponds to a Soccer Club social circle established by the user within the social networking service and can include one or more contacts that are contacts within the social networking service (i.e., the first domain) and one or more contacts that are non-social networking service contacts. In some examples, the non-social networking contacts can be contacts within an email service (i.e., the second domain). The third distribution corresponds to a Friends social circle established by the user within the social networking service and can include one or more contacts that are contacts within the social networking service (i.e., the first domain).

In some implementations, the ACL service can receive data indicating the first distribution defined in the distribution interface 1000. The ACL service can process the first distribution to determine whether the digital content would be visible outside of the first domain. Continuing with the example above, the first distribution includes any user that accesses the Internet. Consequently, the ACL service determines that the digital content would be visible outside of the first domain, if distributed based on the first distribution. In response, the ACL service provides notification data that can be processed to generate a notification to the user that the digital content would be visible outside of the first domain. In some examples, an initial notification can be provided based on an appearance of the corresponding icon 1002. In the example of FIG. 10A, the color of the icon 1002 can be provided as red, for example, visually indicating that the digital content would be visible outside of the first domain. In some examples, a dialogue bubble 1008 can be displayed to textually indicate that the digital content would be visible outside of the first domain. For example, a user can manipulate a cursor to hover-over the icon 1002 within a display. In response to the hover-over action, the dialogue bubble 1008 can be displayed.

In some implementations, the ACL service can receive data indicating the second distribution defined in the distribution interface 1000. The ACL service can process the second distribution to determine whether the digital content would be visible outside of the first domain. Continuing with the example above, the second distribution includes contacts within the social networking service (i.e., the first domain) and non-social networking service contacts. Consequently, the ACL service determines that the digital content would be visible outside of the first domain, if distributed based on the second distribution. In response, the ACL service provides notification data that can be processed to generate a notification to the user that the digital content would be visible outside of the first domain. In the example of FIG. 10A, the color of the icon 1004 can be provided as red, for example, visually indicating that the digital content would be visible outside of the first domain.

In some implementations, the ACL service can receive data indicating the third distribution defined in the distribution interface 1000. The ACL service can process the third distribution to determine whether the digital content would be visible outside of the first domain. Continuing with the example above, the third distribution includes contacts within the social networking service (i.e., the first domain). Consequently, the ACL service determines that the digital content would not be visible outside of the first domain, if distributed based on the third distribution. In response, the ACL service provides notification data that can be processed to generate a notification to the user that the digital content would not be visible outside of the first domain as a consequence of the third distribution. In the example of FIG. 10A, the color of the icon 1006 can be provided as green, for example, visually indicating that the digital content would only be visible within the first domain as a consequence of the third distribution.

In some implementations, a post button 1010 can be provided. The user can activate (e.g., click on) the post button 1010 to submit the digital content for distribution. In response to the user activation of the post button 1010, and a distribution indicating that the digital content would be distributed outside of the first domain, a confirmation dialogue can be displayed to the user.

With particular reference to FIG. 10B, an example confirmation dialogue 1020 is provided. The example confirmation dialogue 1020 notifies the user that the digital content will be distributed outside of the first domain and displays the icons 1002, 1004, which would result in the distribution of the digital content outside of the first domain. The confirmation dialogue 1020 can include a checkbox 1022, a post button 1024 and a cancel button 1026. The checkbox 1022 can be activated by the user to indicate that, despite the notification that the digital content will be distributed outside of the first domain, the user intends to proceed with distribution of the digital content. In the depicted example, the checkbox 1022 is not activated. Consequently, the post button 1024 is non-actionable (e.g., greyed out). If the user activates the checkbox 1022, the post button 1024 becomes actionable and the user can activate (e.g., click on) the post button to have the digital content distributed.

FIG. 11 corresponds to a domain policy that prohibits users to distribute digital content to contacts that are not contacts within a particular domain. a user of the social networking service can provide input to a distribution interface 1100 to define distribution of digital content, as discussed in detail herein. One or more contacts and/or one or more social circles can be determined based on the user input. The determined contacts and/or social circles can be graphically represented within the distribution interface 1100, as discussed in detail herein. In the example of FIG. 11, a "Friends" icon 1102 represents a distribution. In the depicted example, the distribution corresponds to a Friends social circle established by the user within the social networking service and can include one or more contacts that are contacts within the social networking service (i.e., the first domain).

User input to the distribution interface 1100 can correspond to a distribution that includes one or more contacts external to the first domain. For example, the user can input an email address corresponding to a second domain. In the depicted example, an example email address can be provided as "johndoe@notdomain.com," which can be provided by an email service in the second domain. The ACL service can receive the user input and can process the user input to determine that the email address does not correspond to the first domain. Consequently, an icon corresponding to the email address is not displayed in the distribution interface 1100. Instead, the ACL service can provide notification data to display a notification to the user that the distribution is external to the first domain. In the depicted example, the notification includes a dialogue bubble 1104 indicating that distribution to the email address johndoe@notdomain.com is prohibited.

In some implementations, a domain policy can include a hybrid domain policy that enables users to distribute digital content to one or more domains that are external to the domain of the social networking service, while also prohibiting distribution of digital content to one or more other domains that are also external to the domain of the social networking service.

It is appreciated that the domain policies discussed herein are example domain policies. Accordingly, the ACL service can enforce any appropriate domain policy that can be established by a domain administrator.

Figure 12:
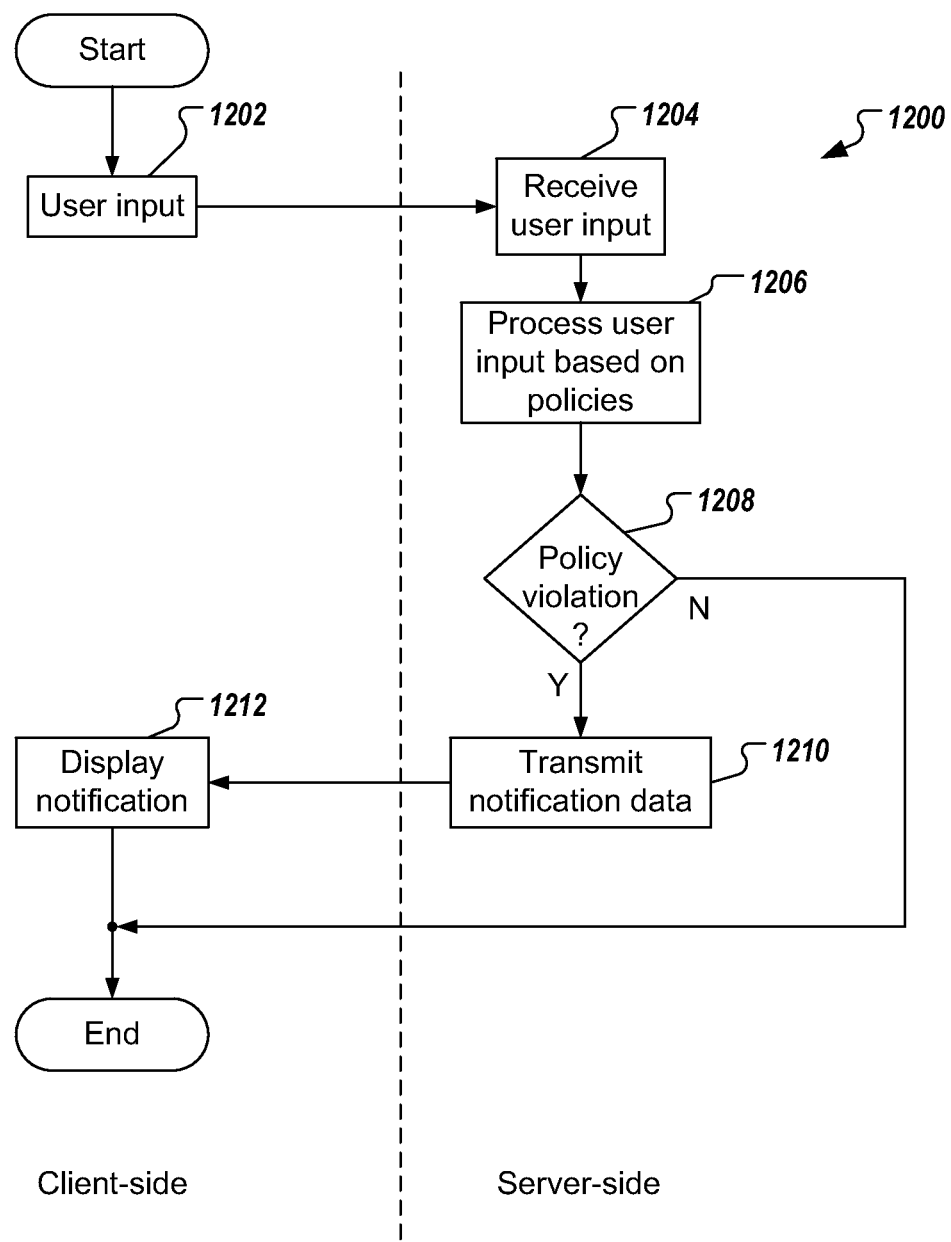
FIG. 12 is a flowchart illustrating an example process for enforcing policies.

FIG. 12 is a flowchart illustrating an example process 1200 for enforcing one or more policies. The example process 1200 can be implemented using one or more program applications executed on one or more computing devices. In some implementations, one or more server systems (e.g., the server system 112 of FIG. 1) and/or one or more client computing devices (e.g., client devices 102-110 of FIG. 1) can perform operations of the example process 1200.

User input is provided (1202). For example, the user input can be provided to a graphical user interface (e.g., a distribution interface) provided on a client-side computing device. The user input is received (1204). For example, the user input can be received by one or more server-side computing devices. The user input can define a distribution indicating one or more contacts to which digital content is to be distributed. The distribution is processed based on one or more policies (1206), each of the one or more policies providing a limitation on distribution of digital content.

It is determined whether the distribution violates at least one policy of the one or more policies (1208) based on the processing. If it is determined that the distribution does not violate at least one policy of the one or more policies, the example process 1200 ends. If it is determined that the distribution violates at least one policy of the one or more policies, notification data is transmitted (1210). A notification is displayed (1212). For example, a client-side computing device can receive the notification data and can display the notification based thereon. The example process 1200 ends.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A system comprising:
a server computing device; and
a computer-readable medium coupled to the server computing device and having instructions stored thereon which, when executed by the server computing device, cause the server computing device to perform server-side operations for distributing digital content for display across a network, the server-side operations comprising:
serving at least one web page document to a client computing device operated by a user, the web page document containing instructions for a browser application to perform client-side operations, comprising:
presenting, within a web page that is external to a first social networking service, web page digital content;
presenting, within the web page, a graphical representation of a content sharing interface of the first social networking service, the graphical representation comprising at least one button icon that is responsive to user input, wherein activation of the button icon indicates that the web page digital content is to be distributed using the first social networking service;
receiving first user input to the button icon, the first user input indicating activation of the button icon;
in response to the first user input:
expanding the content sharing interface within the web page to include an expanded content input area and a distribution interface;
identifying a graphical representation of the web page digital content;
populating the expanded content input area with the graphical representation of the web page digital content;
receiving second user input to the distribution interface, the second user input indicating one or more contacts to which the web page digital content is to be distributed;
in response to receiving the second user input, displaying one or more icons within the distribution interface, each icon of the one or more icons being a graphical representation of the one or more contacts;
receiving third user input to the content sharing interface, the third user input comprising a user instruction to distribute the web page digital content; and
in response to the third user input, transmitting a post data set to the server computing system, the post data set comprising digital content data and distribution data.

2. The system of claim 1, wherein an icon of the one or more icons corresponds to a social circle of the user within a social networking service, the social circle defining a subset of the one or more contacts.

3. The system of claim 1, wherein an icon of the one or more icons corresponds to a second social networking service that the user participates in.

4. The system of claim 3, wherein the second social networking service comprises a micro-blogging social networking service.

5. The system of claim 3, wherein the second social networking service comprises a blogging service.

6. The system of claim 1, wherein an icon of the one or more icons corresponds to at least one contact that is to receive the digital content via email.

7. The system of claim 1, wherein populating further comprises populating the expanded content input area with a summary of the web page digital content within the expanded content input area.

8. The system of claim 1, wherein the client-side operations further comprise displaying one or more digital content selection icons within the expanded content selection area.

9. The system of claim 8, wherein the client-side operations further comprise:
receiving fourth user input, the fourth user input indicating a selection of an icon of the one or more digital content selection icons; and
in response to receiving the fourth user input, displaying a digital content selection interface through which a user can select additional digital content for distribution.

10. The system of claim 8, wherein the one or more digital content selection icons comprise a digital image selection icon, a digital video selection icon, a link selection icon and a map selection icon.

11. The system of claim 8, wherein the one or more digital content selection icons are displayed in the content sharing interface prior to receiving the first user input.

12. The system of claim 1, wherein the client-side operations further comprise:
receiving fourth user input, the fourth user input indicating a hover action over the button icon; and
in response to the fourth user input, displaying a dialog box, the dialog box displaying data corresponding to contacts that have shared the digital content.

13. The system of claim 12, wherein the first user input comprises user selection of the button icon.

14. The system of claim 1, wherein the web page comprises a search results page and the button icon is associated with a search result displayed within the web page.

15. The system of claim 1, wherein the web page comprises a mapping service web page and the digital content comprises a map.

16. The system of claim 15, wherein the post data set further comprises map data comprising scroll data and zoom data corresponding to a map view of the map, the scroll data and the zoom data being usable by the mapping service web page to replicate the map view.

17. The system of claim 1, wherein the server-side operations further comprise:
receiving the post data set;
generating an access control list (ACL) based on the distribution data, the distribution data corresponding to the one or more contacts; and
distributing the digital content based on the ACL.

18. The system of claim 1, wherein the web page comprises a web page of the social networking service.

19. The system of claim 1, wherein each of the plurality of web pages comprises a web page of the social networking service.

20. The system of claim 1, wherein the web page comprises a web page of a website that is external to a domain of the social networking service.

21. A non-transitory computer storage medium encoded with a computer program, the program comprising instructions that when executed by one or more computers cause the one or more computers to perform operations comprising:
presenting, within a web page that is external to a first social networking service, web page digital content;
presenting, within the web page, a graphical representation of a content sharing interface of the first social networking service, the graphical representation comprising at least one button icon that is responsive to user input, wherein activation of the button icon indicates that the web page digital content is to be distributed using the first social networking service;

receiving first user input to the button icon, the first user input indicating activation of the button icon;

in response to the first user input:
  expanding the content sharing interface within the web page to include an expanded content input area and a distribution interface;
  identifying a graphical representation of the web page digital content;
  populating the expanded content input area with the graphical representation of the web page digital content;

receiving second user input to the distribution interface, the second user input indicating one or more contacts to which the web page digital content is to be distributed;

in response to receiving the second user input, displaying one or more icons within the distribution interface, each icon of the one or more icons being a graphical representation of the one or more contacts;

receiving third user input to the content sharing interface, the third user input comprising a user instruction to distribute the web page digital content; and in response to the third user input, transmitting a post data set to the server computing system, the post data set comprising digital content data and distribution data.

22. A computer-implemented method comprising:

presenting, within a web page that is external to a first social networking service, web page digital content;

presenting, within the web page, a graphical representation of a content sharing interface of the first social networking service, the graphical representation comprising at least one button icon that is responsive to user input, wherein activation of the button icon indicates that the web page digital content is to be distributed using the first social networking service;

receiving first user input to the button icon, the first user input indicating activation of the button icon;

in response to the first user input:
  expanding the content sharing interface within the web page to include an expanded content input area and a distribution interface;
  identifying a graphical representation of the web page digital content;
  populating the expanded content input area with the graphical representation of the web page digital content;

receiving second user input to the distribution interface, the second user input indicating one or more contacts to which the web page digital content is to be distributed;

in response to receiving the second user input, displaying one or more icons within the distribution interface, each icon of the one or more icons being a graphical representation of the one or more contacts;

receiving third user input to the content sharing interface, the third user input comprising a user instruction to distribute the web page digital content; and in response to the third user input, transmitting a post data set to the server computing system, the post data set comprising digital content data and distribution data.

23. A system comprising:
a server computing device; and
a computer-readable medium coupled to the server computing device and having instructions stored thereon which, when executed by the server computing device, cause the server computing device to perform server-side operations for distributing digital content for display across a network, the server-side operations comprising:
  serving at least one web page document to a client computing device operated by a user, the web page document containing instructions for a browser application to perform client-side operations, comprising:
    displaying, within a web page that is external to a social networking service, web page digital content;
    displaying, within the web page, a graphical representation of a content sharing interface of the social networking service, the graphical representation comprising at least one button icon that is responsive to user input, wherein activation of the button icon indicates that the web page digital content is to be distributed using the social networking service;
    receiving first user input to the button icon, the first user input indicating a user intent to distribute digital content associated with web page digital content using the social networking system;
    in response to receiving the first user input;
    expanding the content sharing interface within the web page to include an expanded content input area and a distribution interface;
    identifying a graphical representation of the web page digital content;
    populating the expanded content input area with the graphical representation of the web page digital content;
    receiving second user input through the distribution interface, the second user input indicating one or more social circles, each social circle comprising one or more contacts to which the digital content is to be distributed;
    in response to receiving the second user input, displaying one or more icons within the distribution interface, each icon of the one or more icons being a graphical representation of the one or more social circles;
    receiving third user input to the content sharing interface, the third user input comprising a user instruction to distribute the digital content; and
    in response to the third user input, transmitting a post data set to the server computing system, the post data set comprising digital content data and distribution data.

24. The system of claim 1, wherein the client-side operations further comprise:
  receiving fourth user input, the fourth user input including textual comments to the expanded content input area associated with the graphical representation of the web page digital content,
  wherein populating further comprises populating the expanded content input area prior to receiving the fourth user input.

* * * * *

UNITED STATES PATENT AND TRADEMARK OFFICE
CERTIFICATE OF CORRECTION

PATENT NO. : 8,707,184 B2
APPLICATION NO. : 13/164636
DATED : April 22, 2014
INVENTOR(S) : Rita Chen et al.

Page 1 of 1

It is certified that error appears in the above-identified patent and that said Letters Patent is hereby corrected as shown below:

In the Claims

Column 28, line 27, in Claim 23, delete "input;" and insert -- input: --.

Signed and Sealed this
Twenty-ninth Day of July, 2014

Michelle K. Lee
*Deputy Director of the United States Patent and Trademark Office*